US011543506B2

(12) United States Patent
Voynov

(10) Patent No.: US 11,543,506 B2
(45) Date of Patent: Jan. 3, 2023

(54) METHOD AND COMPUTER DEVICE FOR CALIBRATING LIDAR SYSTEM

(71) Applicant: YANDEX SELF DRIVING GROUP LLC, Moscow (RU)

(72) Inventor: Andrey Sergeevich Voynov, Moscow (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 400 days.

(21) Appl. No.: 16/912,176

(22) Filed: Jun. 25, 2020

(65) Prior Publication Data
US 2021/0132201 A1 May 6, 2021

(30) Foreign Application Priority Data
Nov. 6, 2019 (RU) .......................... RU2019135591

(51) Int. Cl.
G01S 7/497 (2006.01)
B60W 60/00 (2020.01)
(Continued)

(52) U.S. Cl.
CPC .............. G01S 7/497 (2013.01); B60W 50/06 (2013.01); B60W 60/0025 (2020.02); G01S 7/4808 (2013.01); B60W 2420/52 (2013.01)

(58) Field of Classification Search
None
See application file for complete search history.

(56) References Cited

U.S. PATENT DOCUMENTS 11,391,826 B2* 7/2022 Singh .................... G01S 17/931
11,433,893 B2* 9/2022 Valchok ................. G06V 20/56
(Continued)

FOREIGN PATENT DOCUMENTS

DE 102017105209 A1 9/2018
FR 2942064 A1 8/2010
(Continued)

OTHER PUBLICATIONS

English Abstract for FR2942064 retrieved on Espacenet on Jun. 25, 2020.
(Continued)

Primary Examiner — Jonathan M Dager
(74) Attorney, Agent, or Firm — BCF LLP

(57) ABSTRACT

Methods and devices for determining axis of symmetry of self-driving vehicle (SDV) and for calibrating a Light Detection and Ranging (LIDAR) system are disclosed. One of the axes of the system of coordinates of the LIDAR system extends along a normal direction of a ground surface. the method includes acquiring a subset of detected points in the system of coordinates; generating a subset of mirror-image points based on the subset of detected points; projecting the subset of mirror-image points onto the subset of detected points so as to define pairs of overlapping data points; using symmetrically opposite detected points for determining the axis of symmetry of the SDV in the system of coordinates of the LIDAR system; and calibrating the LIDAR system using an angular offset between the axis of symmetry of the SDV and an other one of the axes of the system of coordinates of the LIDAR system.

21 Claims, 9 Drawing Sheets

(51) Int. Cl.
  *B60W 50/06* (2006.01)
  *G01S 7/48* (2006.01)

(56) References Cited

U.S. PATENT DOCUMENTS

| | | | |
|---|---|---|---|
| 11,433,902 B2* | 9/2022 | Murashkin | G01S 7/4802 |
| 2008/0243390 A1 | 10/2008 | Nakamori | |
| 2016/0272199 A1 | 9/2016 | Kawahara et al. | |
| 2017/0129391 A1* | 5/2017 | Solar | B60Q 1/0023 |
| 2017/0285649 A1 | 10/2017 | Debreczeni | |
| 2017/0343654 A1* | 11/2017 | Valois | G01S 17/931 |
| 2018/0210451 A1 | 7/2018 | Naik et al. | |
| 2018/0259958 A1 | 9/2018 | Kalanick et al. | |
| 2018/0307925 A1 | 10/2018 | Wisniowski et al. | |
| 2019/0179029 A1* | 6/2019 | Pacala | G01S 17/87 |
| 2020/0158840 A1* | 5/2020 | Ikram | G01S 13/867 |
| 2020/0191927 A1* | 6/2020 | Lin | G01S 7/497 |
| 2021/0004610 A1* | 1/2021 | Huang | G01S 17/931 |
| 2021/0157002 A1* | 5/2021 | Yangel | B60W 40/00 |
| 2021/0192236 A1* | 6/2021 | Katrenko | G06T 7/0002 |
| 2021/0197853 A1* | 7/2021 | Fedorov | G06V 20/588 |
| 2021/0197895 A1* | 7/2021 | Valchok | G06V 20/56 |
| 2021/0199783 A1* | 7/2021 | Voynov | G01S 17/87 |
| 2021/0323572 A1* | 10/2021 | He | G06T 7/30 |
| 2021/0356562 A1* | 11/2021 | Liu | G01S 17/42 |
| 2021/0373138 A1* | 12/2021 | Jiang | B60W 60/00 |
| 2022/0194412 A1* | 6/2022 | Zhang | G06V 20/56 |
| 2022/0204019 A1* | 6/2022 | Lauterbach | G01S 17/88 |
| 2022/0227380 A1* | 7/2022 | Griffith | G06T 7/85 |
| 2022/0269279 A1* | 8/2022 | Redford | G05D 1/0044 |
| 2022/0284627 A1* | 9/2022 | Johnson | B60W 50/06 |

FOREIGN PATENT DOCUMENTS

| | | |
|---|---|---|
| WO | 2017013749 A1 | 1/2017 |
| WO | 2019073526 A1 | 4/2019 |
| WO | 2019145073 A1 | 8/2019 |

OTHER PUBLICATIONS

Liu et al.,"On-road vehicle recognition using the symmetry property and snake models", International Journal of Advanced Robotic Systems, 2013, vol. 10, pp. 1-9, https://journals.sagepub.com/doi/pdf/10.5772/57382.

Pereira et al., "Self calibration of multiple LIDARs and cameras on autonomous vehicles", ResearchGate, 2016, 32 pages, https://www.researchgate.net/publication/303713368_Self_calibration_of_multiple_LIDARs_and_cameras_on_autonomous_vehicles.

European Search Report issued in corresponding European patent application No. 2017812.3 dated Nov. 18, 2020.

Russian Search report dated Jun. 23, 2021 in respect of the counterpart Russian Patent Application RU 2019135591.

* cited by examiner

METHOD AND COMPUTER DEVICE FOR CALIBRATING LIDAR SYSTEM

CROSS-REFERENCE

The present application claims priority to Russian Patent Application No. 2019135591, entitled "Method and Computer Device for Calibrating LIDAR System," filed on Nov. 6, 2019, the entirety of which is incorporated herein by reference.

FIELD OF TECHNOLOGY

The present technology relates to methods and electronic devices for vehicle control, and more specifically, to methods and electronic devices for calibrating a LIDAR system.

BACKGROUND

Several computer-based navigation systems that are configured for aiding navigation and/or control of vehicle have been proposed and implemented in the prior art. These systems range from more basic map-aided localization-based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously driven vehicles include computer systems that can cause the vehicle to accelerate, brake, stop, change lane and self-park.

One of the main technical challenges in implementing the above computer systems is the ability for the computer system to detect an object located around the vehicle. In one example, the computer systems may need the ability to detect the vehicle in front of the present vehicle (the present vehicle having the computer system onboard), which vehicle in front may pose a risk/danger to the present vehicle and may require the computer system to take a corrective measure, be it breaking or otherwise changing speed, stopping or changing lanes.

Other technical challenges with the implementation of the above computer systems is de-calibration of sensors and other systems that gather data about surroundings the vehicle. A plethora of factors, including weather, road conditions, driving habits, for example, influence sensors and other systems over time which require calibration in order to ensure that data is accurately captured and correctly used by other systems for controlling vehicles.

SUMMARY

Developers of the present technology have realized that prior art solution have drawbacks.

In a first broad aspect of the present technology, there is provided a method of calibrating a Light Detection and Ranging (LIDAR) system. The LIDAR system has a system of coordinates. The system of coordinates has axes. One of the axes extends along a normal direction of a ground surface. The LIDAR system is mountable on a self-driving vehicle (SDV). The SDV is located on the ground surface. The method is executable by an electronic device associated with the SDV. The method comprises acquiring, by the electronic device, from the LIDAR system a subset of detected data points in the system of coordinates of the LIDAR system and representing an outer surface of the SDV. The subset of detected data points is a subset of a plurality of detected data points of the LIDAR system. The method comprises generating, by the electronic device, a subset of mirror-image data points based on the subset of detected data points. The subset of mirror-image data points represents a mirror-image of the outer surface of the SDV. The method comprises projecting, by the electronic device, the subset of mirror-image data points onto the subset of detected data points so as to define pairs of overlapping data points. Each given pair of overlapping data points includes: (i) a first data point from the subset of detected data points and (ii) a second data point from the subset of mirror-image data points, such that the second data point is a mirror-image of a third data point in the subset of detected data points that is symmetrically opposite to the first data point. The method comprises using, by the electronic device, (i) at least two first data points and (ii) at least two respective third data points that are symmetrically opposite to the at least two first data points for determining the axis of symmetry of the SDV in the system of coordinates of the LIDAR system. The method comprises calibrating, by the electronic device, the LIDAR system using an angular offset between the axis of symmetry of the SDV and an other one of the axes of the system of coordinates of the LIDAR system.

In some embodiments of the method, the method further comprises, prior to the acquiring the subset of detected data points, acquiring the plurality of detected data points from the LIDAR system.

In some embodiments of the method, the method further comprises filtering, by the electronic device, the plurality of detected data points for determining the subset of detected data points.

In some embodiments of the method, the filtering the plurality of detected data points comprises applying, by the electronic device, an approximation rule onto the plurality of detected data points detected by the LIDAR system.

In some embodiments of the method, the approximation rule comprises an indication of a threshold distance deemed to include the detected subset of data points.

In some embodiments of the method, the method further comprises, prior to acquiring the plurality of detected data points providing, by the electronic device, an indication to increase the outer surface of the SDV.

In some embodiments of the method, the providing the indication to increase the outer surface comprises providing, by the electronic device, an indication to fully open opposite doors of the SDV.

In some embodiments of the method, the providing the indication to increase the outer surface further comprises providing, by the electronic device, an indication to fully open a trunk of the SDV.

In some embodiments of the method, the projecting, by the electronic device, the subset of mirror-image data points onto the subset of detected data points comprises iteratively minimizing, by the electronic device, the distance between the subset of mirror-image data points and the subset of detected data points.

In some embodiments of the method, the iteratively minimizing the distance comprises determining a transformation rule between the subset of mirror-image data points and the subset of detected data points so as to overlap a given mirror-image data point with a given detected data point. The given mirror-image data point has been generated based on a given other detected point that is symmetrically opposite to the given detected data point.

In some embodiments of the method, the iteratively minimizing the distance comprises applying, by the electronic device, an Iterative Closest Point (ICP) algorithm.

In some embodiments of the method, the (i) at least two first data points and (ii) at least two respective third data points comprises, respectively, two first data points and (ii) two respective third data points.

In some embodiments of the method, the (i) at least two first data points and (ii) at least two respective third data points comprises, respectively, three first data points and (ii) three respective third data points.

In some embodiments of the method, the using (i) at least two first data points and (ii) at least two respective third data points that are symmetrically opposite to the at least two first data points for determining the axis of symmetry of the SDV comprises:
  selecting, by the electronic device, the (i) at least two first data points and (ii) at least two respective third data points;
  for each pair of the (i) at least two first data points and (ii) at least two respective third data points, determining, by the electronic device, a mid point; and
  determining, by the electronic device, a line through the respective mid points as the axis of symmetry of the SDV.

In some embodiments of the method, the system of coordinates of the LIDAR system has three orthogonal axes.

In some embodiments of the method, the plurality of detected data points is gathered in a system of spherical coordinates and is mapped to the system of coordinates of the LIDAR system having three orthogonal axes.

In some embodiments of the method, the subset of mirror-image data points is generated in the system of coordinates of the LIDAR system.

In some embodiments of the method, the subset of mirror-image data points is generated in a same multidimensional space as the subset of detected data points.

In some embodiments of the method, the method further comprises, prior to the calibrating: (i) determining, by the electronic device, the normal direction of the ground surface based on the plurality of detected data points of the LIDAR system, and (ii) anchoring, by the electronic device, the one of the axes of the system of coordinates based on the normal direction of the ground surface, such that the one of the axes extends in the normal direction.

In some embodiments of the method, the method further comprises determining, by the electronic device, the angular offset between the axis of symmetry of the SDV and the one of the axes of the system of coordinates of the LIDAR system.

In some embodiments of the method, the using the angular offset comprises: (i) determining, by the electronic device, a rotational-shift rule based on the angular offset so that the other one of the axes of the system of coordinates of the LIDAR system matches the axis of symmetry of the SDV, and (ii) using, by the electronic device the rotational-shift rule for rotating in-use detected data points of the LIDAR system, thereby determining extrinsically calibrated in-use detected data points.

In some embodiments of the method, the method further comprises iteratively repeating the calibrating the LIDAR system during operation of the SDV.

In a second broad aspect of the present technology, there is provided a method of determining an axis of symmetry of a self-driving vehicle (SDV). The SDV is mountable with a Light Detection and Ranging (LIDAR) system. The LIDAR system has a system of coordinates. The system of coordinates has axes, the method is executable by an electronic device associated with the SDV. The method comprises acquiring, by the electronic device, from the LIDAR system a subset of detected data points in the system of coordinates of the LIDAR system and representing an outer surface of the SDV. The subset of detected data points is a subset of a plurality of detected data points of the LIDAR system. The method comprises generating, by the electronic device, a subset of mirror-image data points based on the subset of detected data points. The subset of mirror-image data points represents a mirror-image of the outer surface of the SDV. The method comprises projecting, by the electronic device, the subset of mirror-image data points onto the subset of detected data points so as to define pairs of overlapping data points. Each given pair of overlapping data points includes: (i) a first data point from the subset of detected data points and (ii) a second data point from the subset of mirror-image data points, such that the second data point is a mirror-image of a third data point in the subset of detected data points that is symmetrically opposite to the first data point. The method comprises using, by the electronic device, (i) at least two first data points and (ii) at least two respective third data points that are symmetrically opposite to the at least two first data points for determining the axis of symmetry of the SDV in the system of coordinates of the LIDAR system.

In a third broad aspect of the present technology, there is provided an electronic device for calibrating a Light Detection and Ranging (LIDAR) system. The LIDAR system has a system of coordinates. The system of coordinates has axes. One of the axes extends along a normal direction of a ground surface. The LIDAR system is mountable on a self-driving vehicle (SDV). The SDV is located on the ground surface. The electronic device is configured to acquire from the LIDAR system a subset of detected data points in the system of coordinates of the LIDAR system and representing an outer surface of the SDV. The subset of detected data points is a subset of a plurality of detected data points of the LIDAR system. The electronic device is configured to generate a subset of mirror-image data points based on the subset of detected data points. The subset of mirror-image data points represents a mirror-image of the outer surface of the SDV. The electronic device is configured to project the subset of mirror-image data points onto the subset of detected data points so as to define pairs of overlapping data points. Each given pair of overlapping data points includes: (i) a first data point from the subset of detected data points and (ii) a second data point from the subset of mirror-image data points, such that the second data point is a mirror-image of a third data point in the subset of detected data points that is symmetrically opposite to the first data point. The electronic device is configured to use (i) at least two first data points and (ii) at least two respective third data points that are symmetrically opposite to the at least two first data points for determining the axis of symmetry of the SDV in the system of coordinates of the LIDAR system. The electronic device is configured to calibrate the LIDAR system using an angular offset between the axis of symmetry of the SDV and an other one of the axes of the system of coordinates of the LIDAR system.

In some embodiments of the electronic device, the electronic device is further configured to, prior to being configured to acquire the subset of detected data points, acquire the plurality of detected data points from the LIDAR system.

In some embodiments of the electronic device, the electronic device is further configured to filter the plurality of detected data points for determining the subset of detected data points.

In some embodiments of the electronic device, the electronic device configured to filter the plurality of detected data points comprises the electronic device being configured to apply an approximation rule onto the plurality of detected data points detected by the LIDAR system.

In some embodiments of the electronic device, the approximation rule comprises an indication of a threshold distance deemed to include the detected subset of data points.

In some embodiments of the electronic device, the electronic device is further configured to, prior to being configured to acquire the plurality of detected data points, provide an indication to increase the outer surface of the SDV.

In some embodiments of the electronic device, to provide the indication to increase the outer surface comprises the electronic device being configured to provide an indication to fully open opposite doors of the SDV.

In some embodiments of the electronic device, to provide the indication to increase the outer surface comprises the electronic device being configured to provide an indication to fully open a trunk of the SDV.

In some embodiments of the electronic device, the electronic device configured to project the subset of mirror-image data points onto the subset of detected data points comprises the electronic device being configured to iteratively minimize the distance between the subset of mirror-image data points and the subset of detected data points.

In some embodiments of the electronic device, to iteratively minimize the distance comprises the electronic device being configured to determine a transformation rule between the subset of mirror-image data points and the subset of detected data points so as to overlap a given mirror-image data point with a given detected data point. The given mirror-image data point has been generated based on a given other detected point that is symmetrically opposite to the given detected data point.

In some embodiments of the electronic device, to iteratively minimize the distance comprises the electronic device being configured to apply an Iterative Closest Point (ICP) algorithm.

In some embodiments of the electronic device, the (i) at least two first data points and (ii) at least two respective third data points comprises, respectively, two first data points and (ii) two respective third data points.

In some embodiments of the electronic device, the (i) at least two first data points and (ii) at least two respective third data points comprises, respectively, three first data points and (ii) three respective third data points.

In some embodiments of the electronic device, to use (i) at least two first data points and (ii) at least two respective third data points that are symmetrically opposite to the at least two first data points for determining the axis of symmetry of the SDV comprises the electronic device configured to:

select the (i) at least two first data points and (ii) at least two respective third data points;

for each pair of the (i) at least two first data points and (ii) at least two respective third data points, determine a mid point; and determine a line through the respective mid points as the axis of symmetry of the SDV.

In some embodiments of the electronic device, the system of coordinates of the LIDAR system has three orthogonal axes.

In some embodiments of the electronic device, the plurality of detected data points is gathered in a system of spherical coordinates and is mapped to the system of coordinates of the LIDAR system having three orthogonal axes.

In some embodiments of the electronic device, the subset of mirror-image data points is generated in the system of coordinates of the LIDAR system.

In some embodiments of the electronic device, the subset of mirror-image data points is generated in a same multidimensional space as the subset of detected data points.

In some embodiments of the electronic device, the electronic device is further configured to, prior to being configured to calibrate, (i) determine the normal direction of the ground surface based on the plurality of detected data points of the LIDAR system, and (ii) anchor the one of the axes of the system of coordinates based on the normal direction of the ground surface, such that the one of the axes extends in the normal direction.

In some embodiments of the electronic device, the electronic device is further configured to determine the angular offset between the axis of symmetry of the SDV and the one of the axes of the system of coordinates of the LIDAR system.

In some embodiments of the electronic device, using the angular offset comprises the electronic device being configured to (i) determine a rotational-shift rule based on the angular offset so that the other one of the axes of the system of coordinates of the LIDAR system matches the axis of symmetry of the SDV, and (ii) use the rotational-shift rule for rotating in-use detected data points of the LIDAR system, thereby determining extrinsically calibrated in-use detected data points.

In some embodiments of the electronic device, the electronic device is further configured to iteratively calibrate the LIDAR system during operation of the SDV.

In a fourth broad aspect of the present technology, there is provided an electronic device for determining an axis of symmetry of a self-driving vehicle (SDV), the SDV being mountable with a Light Detection and Ranging (LIDAR) system. The LIDAR system has a system of coordinates. The system of coordinates has axes. The SDV is located on the ground surface. The electronic device is configured to acquire from the LIDAR system a subset of detected data points in the system of coordinates of the LIDAR system and representing an outer surface of the SDV. The subset of detected data points is a subset of a plurality of detected data points of the LIDAR system. The electronic device is configured to generate a subset of mirror-image data points based on the subset of detected data points. the subset of mirror-image data points represents a mirror-image of the outer surface of the SDV. The electronic device is configured to project the subset of mirror-image data points onto the subset of detected data points so as to define pairs of overlapping data points. Each given pair of overlapping data points includes: (i) a first data point from the subset of detected data points and (ii) a second data point from the subset of mirror-image data points, such that the second data point is a mirror-image of a third data point in the subset of detected data points that is symmetrically opposite to the first data point. The electronic device is configured to use (i) at least two first data points and (ii) at least two respective third data points that are symmetrically opposite to the at least two first data points for determining the axis of symmetry of the SDV in the system of coordinates of the LIDAR system.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
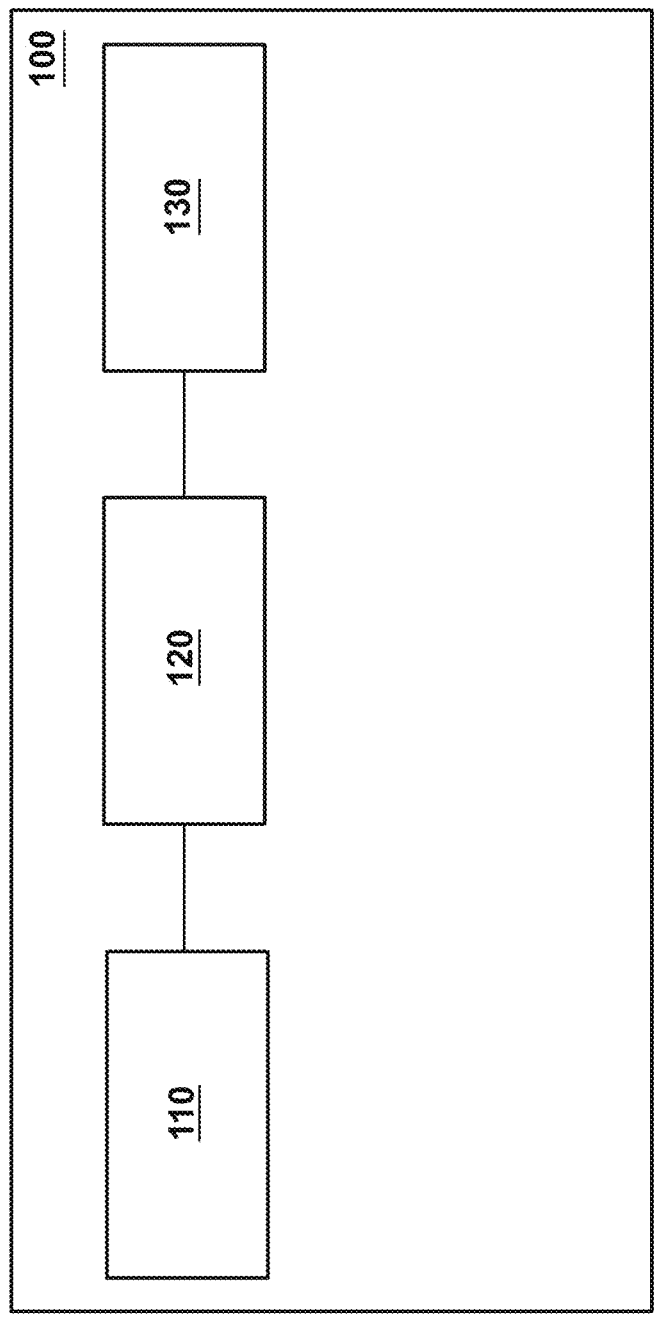
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
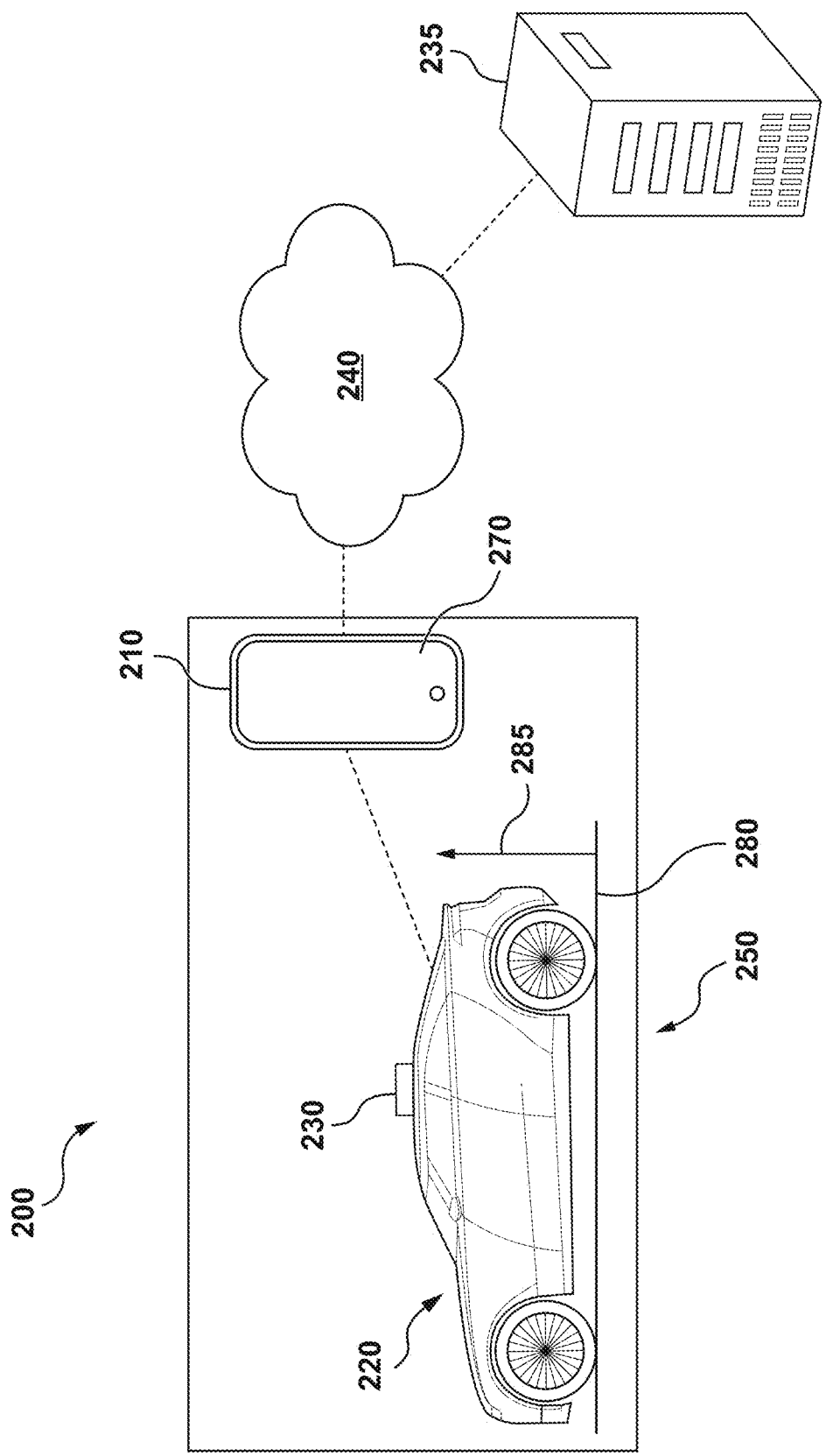
FIG. 2 depicts a networked computing environment being suitable for use with some embodiments of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who can operate the vehicle 220, a server 235 in communication with the electronic device 210 via a communication network 245 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Vehicle (SDV). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

It should be noted that the vehicle 220 may be operated on a ground surface 280 (see FIG. 2). For example, the vehicle 220 may be located on the ground surface 280, having a normal direction 285 as illustrated, and may travel thereon during operation.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for processing data as will be described in greater detail below.

LIDAR System

In accordance to the non-limiting embodiments of the present technology, the electronic device 210 further comprises or has access to a Light Detection and Ranging (LIDAR) system 230 that, broadly speaking, is configured to capture data about at least a portion of a surrounding area 250 of the vehicle 220.

Figure 3:
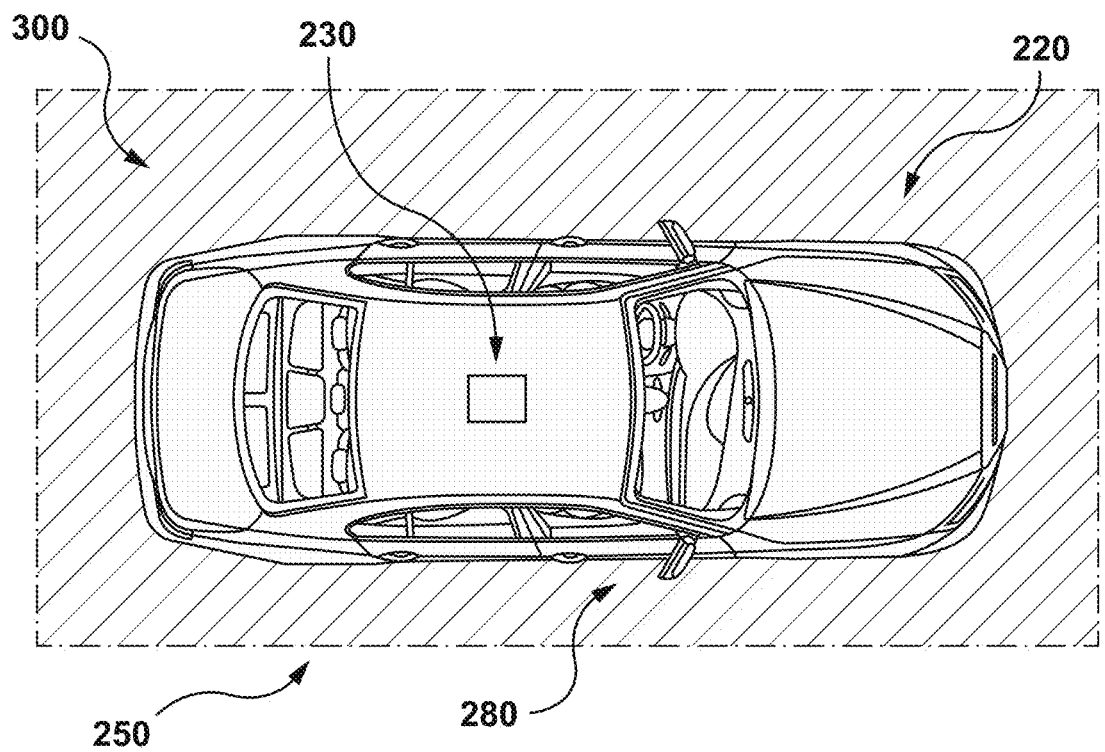
FIG. 3 depicts a birds-eye view of a vehicle of the networked computing environment of FIG. 2 in a non-limiting embodiment of the present technology.

With reference to FIG. 3, there is depicted a birds-eye view 300 of the vehicle 220 in the surrounding area 250. In this non-limiting implementation, the LIDAR system 230 is mounted onto the vehicle 220 on the rooftop thereof and the vehicle 220 is located on the ground surface 280.

However, it is contemplated that the LIDAR system 230 may be mounted (or retrofitted) onto the vehicle 220 in a variety of locations and/or in a variety of configurations. For example, LIDAR system 230 can be mounted on an interior, upper portion of a windshield of the vehicle 220, but other locations are within the scope of the present disclosure, including on a back window, side windows, front hood, rooftop, front grill, front bumper or the side of the vehicle 220. In other non-limiting embodiments of the present technology, the LIDAR system 230 can even be mounted in a dedicated enclosure (not depicted) mounted on the top of the vehicle 220.

Irrespective of the specific location where the LIDAR system 230 is mounted onto the vehicle 220, as mentioned above, the LIDAR system 230 is configured to capture data about the surroundings 250 of the vehicle 220. How the LIDAR system 230 is configured to capture data about the surroundings 250 of the vehicle 220 will now be described.

Broadly speaking, the LIDAR system 230 includes inter alia (i) a radiation emitting component and (ii) a radiation detection component. The radiation emitting component of the LIDAR system 230, such as one or more laser devices (for example), emits radiation towards the surroundings of the LIDAR system 230 (e.g., towards the surrounding area 250 of the vehicle 220). The emitted radiation then scatters (and/or reflected, for example) in a plurality of directions upon contact with an object in the surroundings of the LIDAR system 230.

At least some of this scattered (and/or reflected) radiation is scattered (and/or reflected) in a direction of the radiation detection component of the LIDAR system 230 which captures this scattered radiation. Once the scattered radiation is captured, the LIDAR system 230 determines a "time of flight" of the radiation—that is, the difference between (i) the moment in time when the radiation has been emitted and (ii) the moment in time when the scattered radiation has been captured. Using this time of flight and the speed of light, The LIDAR system 230 is able to determine a position of the object that scattered (and/or reflected) the emitted radiation relative to the LIDAR system 230.

The LIDAR system 230 expresses the so-determined position of the object as a detected data point in a multidimensional space (e.g., in a 3D space). As such, due to repeated radiation emission and scattered radiation capturing, the LIDAR system 230 may be configured to determine a large number of detected data points which together form a multidimensional map (e.g., a 3D map) of objects that are in the proximity of the LIDAR system 230.

Figure 4:
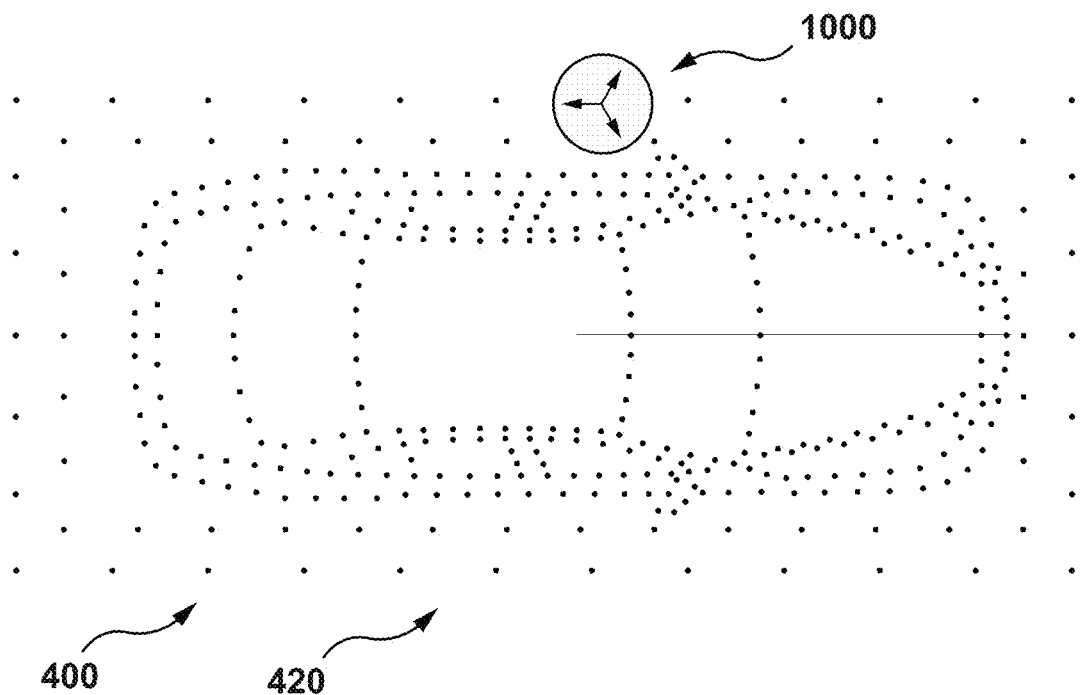
FIG. 4 depicts a birds-eye view representation of a plurality of detected data points in a multidimensional space as provided by a LIDAR system of the networked computing environment of FIG. 2 in a non-limiting embodiment of the present technology.

To better illustrate this, reference will now be made to FIG. 4 depicting a birds-eye view representation 400 of a plurality of detected data points 420 in a multidimensional space. This multidimensional space may be represented in a system of coordinates 1000 of the LIDAR system 230.

As it can be seen in FIG. 4, the LIDAR system 230 may be configured to generate the plurality of detected data points 420 which together form a multidimensional map of objects in the proximity of the LIDAR system 230—that is, as illustrated, the plurality of detected data points 420 together form a multidimensional map of (i) the outer surface of the vehicle 220 and (ii) the ground surface 280.

However, it should be noted that if other objects were in the surroundings of the LIDAR system 230 (in addition to the vehicle 220), a plurality of detected data points 420 would form a multidimensional map of (i) the outer surface of the vehicle 220, (iii) the ground surface 280, and (iii) the other objects, without departing from the scope of the present technology.

Figure 10:
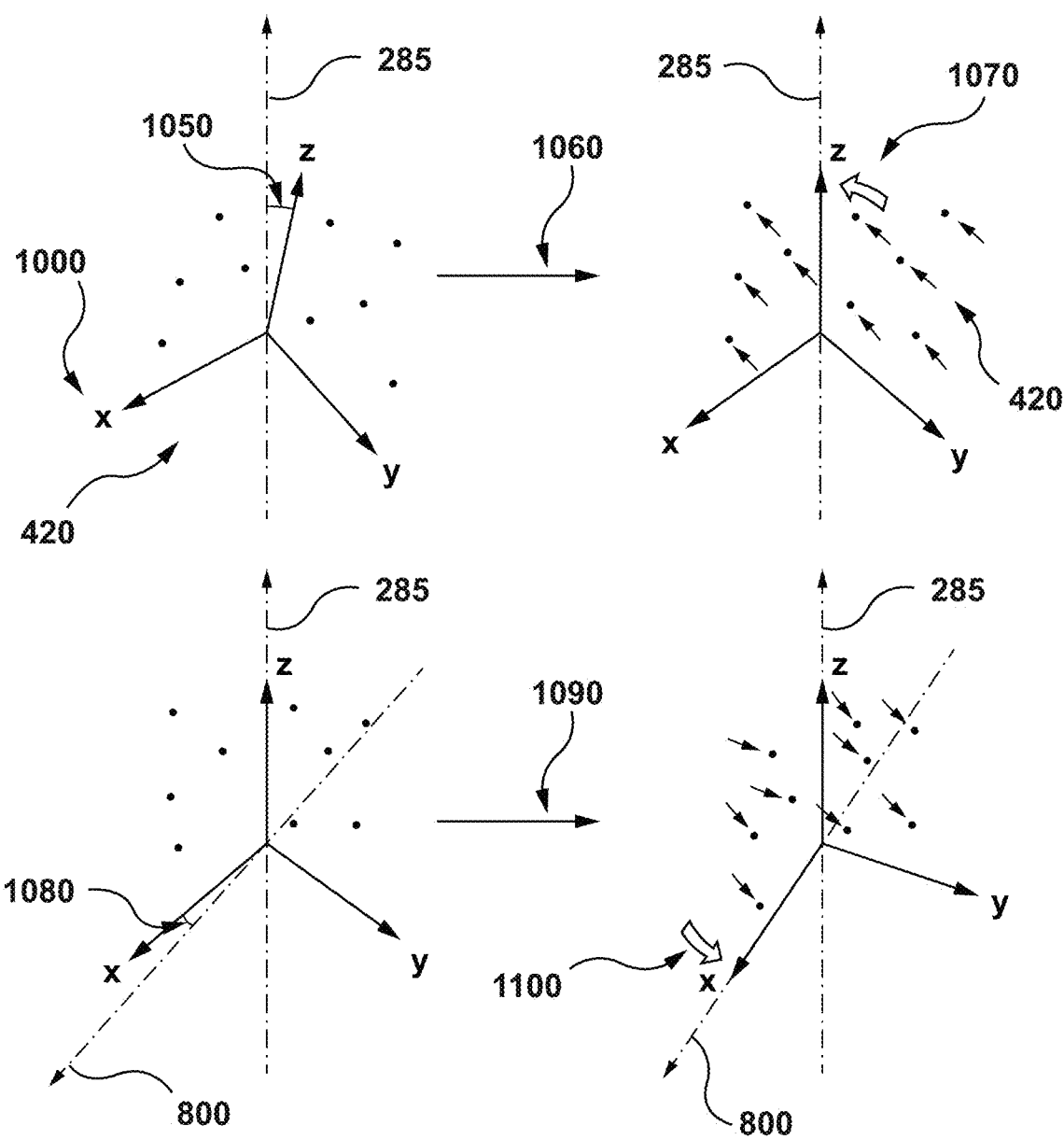
FIG. 10 depicts a schematic illustration of how angular offsets and rotational-shift rules are determined by the electronic device of FIG. 2, in accordance with the non-limiting embodiments of the present technology.

With reference to FIG. 10, the system of coordinates 1000 of the LIDAR system 230 will now be described. Broadly speaking, the LIDAR system 230 may use the system of coordinates 1000 for locating various detected data points in the multidimensional space mentioned above. For example, the system of coordinates 1000 of the LIDAR system 230 may comprise three orthogonal axes, namely, "x", "y", and "z" axes. As such, the system of coordinates 1000 of the LIDAR system 230 may allow the LIDAR system 230 to map the plurality of detected data points 420 in 3D space having a first dimension in the "x" axis, a second dimension in the "y" axis, and a third dimension in the "z" axis.

It is contemplated however that, during detection (e.g., when the LIDAR system 230 is generating the plurality of detected data points 420), the LIDAR system 230 may determine location of the plurality of detected data points 420 in a system of spherical coordinates, and subsequently, the plurality of detected data points 420 may be mapped by the LIDAR system 230 to the system of coordinates 1000 having the three orthogonal axes, as described above.

Returning to the description of FIG. 2, the LIDAR system 230 is communicatively coupled to the processor 110 of the electronic device 210 for transmitting data about at least a portion of the surroundings of the LIDAR system 230 (e.g., including the plurality of detected data points 420) to the processor 110 for processing thereof. Although it will be described in more details herein below, the data transmitted by the LiDAR system 230 to the processor 110 may be used by the electronic device 210 for controlling/maneuvering the vehicle 220.

It should be noted that a verity of additional sensors and systems may be implemented in combination with the LiDAR system 230 on the vehicle 220 in some embodiments of the present technology. For example, camera-type sensors may be mounted to the vehicle 220 and be communicatively coupled to the processor 110. In another example, radar-type systems may be mounted to the vehicle 220 and be communicatively coupled to the processor 110. As such, the vehicle 220 is depicted in FIG. 2 for the sake of simplicity as having only the LIDAR system 230—however in other embodiments, the vehicle 220 may be implemented with additional sensors and systems to the LIDAR system 230, without departing from the scope of the present technology.

The LIDAR system 230 is calibratable.

In a first case, the LIDAR system 230 may undergo an "intrinsic calibration". Broadly speaking, intrinsic calibration refers to techniques that may be used to ensure that the LIDAR system 230 is functioning properly and that the LIDAR system 230 accurately captures and generates data. Put another way, "intrinsic calibration" may be performed to ensure that the data captured or generated by the LIDAR system 230 is not itself biased due to the LIDAR system 230 malfunctioning or functioning abnormally.

In one example, the LIDAR system 230 may be malfunctioning or functioning abnormally if it erroneously determines the time of flight of radiation, which results in an erroneous position of the object that scattered radiation and, hence, results in an erroneously detected data point. Intrinsic calibration is typically performed initially during the manufacturing of the LIDAR system 230. Intrinsic calibration of the LIDAR system 230 may also potentially be performed during retrofitting of the vehicle 220 with the LIDAR system 230.

In a second case, the LIDAR system 230 may also undergo an "extrinsic calibration". Broadly speaking, extrinsic calibration refers to techniques that may be used to ensure that the data provided by the LIDAR system 230 (e.g., detected data points forming the multidimensional map of the surroundings of the LiDAR system 230) is properly used by other systems. This means that, even though the LIDAR system 230 is functioning properly (for example, the LIDAR system 230 having underwent a successful intrinsic calibration), the data provided by the LIDAR system 230 may be (although being unbiased itself) biasedly used by other systems due to a variety of factors.

Hence, extrinsic calibration is not used to compensate for the malfunctioning or abnormal functioning of the LIDAR system 230 per se, but rather to compensate for at least some of the variety of factors due to which the data provided by the LIDAR system 230 may be biasedly used by the other systems.

As it will become apparent from the description herein below, developers of the present technology have devised methods and devices for performing extrinsic calibration of the LIDAR system 230. Which factor(s) may be compensated via the methods and devices devised by the developers of the present technology and how they may allow performing extrinsic calibration of the LIDAR system 230 will be described in greater details herein further below.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

Server

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Extrinsic Calibration of LIDAR System

As mentioned above, the developers of the present technology have devised methods and systems for performing extrinsic calibration of the LIDAR system 230 to compensate for at least some of the variety of factors due to which the data provided by the LIDAR system 230 may be biasedly used by the other systems.

To better illustrate this, let it be assumed that the LIDAR system 230 is mounted on top of the vehicle 220 as seen on FIG. 3.

First, it should be noted that the vehicle 220 has a "forward direction" that is the direction in which the vehicle 220 travels during operation. This means that when the vehicle 220 is travelling strictly forward, the vehicle 220 is traveling strictly along this forward direction. Typically, the forward direction coincides with a longitudinal axis of the frame of the vehicle 220. In some embodiments, the longitudinal axis of the frame of the vehicle 220 may also coincide with an axis of symmetry of the vehicle 220 such that the portions of the vehicle 220 located on each side of the longitudinal axis of the frame are mirror-images of each other.

Second, it should be noted that the vehicle 220 travels in this forward direction on the ground surface 280. The ground surface 280, as described above, has the normal direction 285 which is a direction that is normal to the ground surface 280. For example, in at least some cases, it is contemplated that the forward direction of the vehicle 220 may be orthogonal to the normal direction 285 of the ground surface 280.

Third, it should be noted that the LIDAR system 230 has the system of coordinates 1000 that is used for mapping the plurality of detected data points 420 in 3D space relative to the LIDAR system 230. However, although the plurality of detected data points 420 are mapped in 3D space relative to the LIDAR system 230 (in the system of coordinates 1000), the electronic device 210 does not apriori know, per se, how the plurality of detected data points 420 are to be mapped in 3D space relative to the vehicle 220.

Therefore, during extrinsic calibration of the LIDAR system 230, the electronic device 210 may be tasked with determining, in a sense, "reference information" about the vehicle 220 and/or the surroundings 250 in order to map the plurality of detected data points 420 relative to the vehicle 220 (and not solely relative to the LIDAR system 230).

To better illustrate the problem, an example of calibration during retrofitting of the vehicle 220 with the LIDAR system 230 will now be described. During retrofitting of the vehicle 220 with the LIDAR system 230, the reference information may be initially measured, or otherwise determined, by a human operator (for example) tasked with mounting the LIDAR system 230 on the vehicle 220. For example, when the LIDAR system 230 is being initially mounted on the vehicle 220, the human operator may:

measure, or otherwise determine, the axis of symmetry of the vehicle 220;

measure, or otherwise determine, the normal direction 285 of the ground surface 280; and mount the LIDAR system 230 on the vehicle 220 so that:
(i) one of the axes of the system of coordinates 1000 of the LIDAR system 230 corresponds to the forward direction of the vehicle 220 (e.g., axis of symmetry of the vehicle 220); and
(ii) an other one of the axes of the system of coordinates 1000 of the LIDAR system 230 corresponds to the normal direction 285 of the ground surface 280.

So-mounting the LIDAR system 230 on the vehicle 220 may allow mapping detected data points of the LIDAR system 230 relative to vehicle 220 due to a match of (i) some axes of the system of coordinates 1000 with (ii) the axis of symmetry of the vehicle 220 and the normal direction 285.

As such, in some embodiments, during retrofitting of the vehicle 220 with the LIDAR system 230, the reference information about the vehicle 220 (e.g., the axis of symmetry of the vehicle 220) and about the surroundings 250 (e.g., the normal direction 285 of the ground surface 280) may be measured, or otherwise determined, by the human operator and used to map detected data points of the LIDAR system 230 relative to the vehicle 220.

However, during operation of the vehicle 220, the LIDAR system 230 may be inadvertently displaced relative to the vehicle 220. In one non-limiting example, the vehicle 220 may encounter a "bump" on the road upon which it is travelling. Travelling over this "bump" may displace the LIDAR system 230 with respect to the vehicle 220 which results in an inadvertent mismatch between (i) the axes of the system of coordinates 1000 of the LIDAR system 230, and (ii) the axis of symmetry of the vehicle 220 and the normal direction 285 of the ground surface 280 (e.g., the reference information). It should be noted that other factors, such as weather for example, may cause this inadvertent mismatch during operation of the vehicle 220.

As such, the developers of the present technology have devised systems and methods which, in at least some embodiments of the present technology, are used by the electronic device 210 to determine, during operation of the vehicle 220, the reference information about the vehicle 220 (e.g., the axis of symmetry of the vehicle 220) and about the surroundings 250 (e.g., the normal direction 285 of the ground surface 280) for mapping detected data points of the LIDAR system 230 relative to the vehicle 220 and, then, use the detected data points of the LIDAR system 230 mapped relative to the vehicle 220 for controlling/maneuvering the vehicle 220.

With reference to FIG. 10, in at least some embodiments of the present technology, the electronic device 210 may be configured to, during operation of the vehicle 220:

(i) determine the normal direction 285 of the ground surface 280 in the system of coordinates 1000 of the LIDAR system 230 (e.g., reference information about the surroundings 250)'

(ii) determine a first angular offset 1050 between the normal direction 285 and one of the axes of the system of coordinates 1000 (for example, the "z" axis as illustrated);

(iii) based on the first angular offset 1050, determine a first rotational-shift rule 1060 for anchoring (e.g., aligning) the one of the axes of the system of coordinates 1000 with the normal direction 285, thereby rotating the plurality of detected data points 420 in a direction of a first arrow 1070;

(iv) determine an axis of symmetry 800 of the vehicle 220 in the system of coordinates 1000 of the LIDAR system 230 (e.g., reference information about the vehicle 220);

(v) determine a second angular offset 1080 between the axis of symmetry 800 of the vehicle 220 and an other one of the axes of the system of coordinates 1000 (for example, the "x" axis as illustrated); and (vi) based on the second angular offset 1080, determine a second rotational-shift rule 1090 for anchoring (e.g., aligning) the other one of the axes of the system of coordinates 1000 with the axis of symmetry 800 of the vehicle 220, thereby rotating the plurality of detected data points 420 in a direction of a second arrow 1100.

Hence, even though the LIDAR system 230 is inadvertently displaced relative to the vehicle 220 during operation, the electronic device 210 may execute the above steps for extrinsically calibrating the LIDAR system 230—that is, in this case, map the plurality of detected data points 420 of the LIDAR system 230 relative to the vehicle 220. In other words, the electronic device 210 may be configured to perform the above steps for compensating for the inadvertent displacement of the LIDAR system 230 relative to the vehicle 220 during operation.

Again, as explained above, the extrinsic calibration is not used to compensate for malfunctioning or abnormal functioning of the LIDAR system 230, but rather to compensate for other factors (such as an inadvertently changed positional relationship between the LIDAR system 230 and the vehicle 220, for example) so that detected data points of the LIDAR system 230 are not biasedly used by the electronic device 210 for controlling/maneuvering the vehicle 220.

Thus, it can be said that developers of the present technology have devised methods and devices for extrinsically calibrating the LIDAR system 230 using (i) the first angular offset 1050 between the one of the axes of the system of coordinates 1000 of the LIDAR system 230 and the normal direction 285, and (ii) the second angular offset 1080 between the other one of the axes of the system of coordinates 1000 of the LIDAR system 230 and the axis of symmetry 800 of the vehicle 220.

It is contemplated that the first angular offset 1050 and/or the second angular offset 1080 may be continuously determined, in real-time, during operation of the vehicle 220 (when possible). In some embodiments, this may allow the electronic device 210 to continuously compensate, in real time, for inadvertent displacement of the LIDAR system 230 relative to the vehicle 220.

As mentioned above, it is contemplated that in some embodiments of the present technology, the electronic device 210 may be configured to determine the reference information about the vehicle 220 and/or the surroundings 250. In other words, the electronic device 210 may be configured to, during operation of the vehicle 220, determine (i) the axis of symmetry 800 of the vehicle 220 and (ii) the normal direction 285 of the ground surface 280. How the electronic device 210 may be configured to determine the normal direction 285, the first angular offset 1050, the axis of symmetry of the vehicle 220, and the second angular offset 1080 for performing extrinsic calibration of the LIDAR system 230 will now be described.

Determination of the Normal Direction of the Ground Surface

In some embodiments of the present technology, the electronic device 210 may be configured to employ information about at least some of the plurality of detected data points 420 depicted in FIG. 4 in order to determine the normal direction 285 of the ground surface 280.

In some embodiments, the electronic device 210 may be configured to acquire the plurality of detected data points 420 and may be configured to filter out detected data points that do not correspond to the ground surface 280 and/or determine which detected data points from the plurality of detected data points 420 correspond to the ground surface 280.

This may be performed by the electronic device 210 in a variety of ways. Just as an example, detected data points corresponding to the ground surface 280 may share at least one similar characteristic such as, but not limited to, being located in 3D space in a common 2D plane. As such, the electronic device 210 may be configured to determine the normal direction 285 as being the normal direction of this common 2D plane in the system of coordinates 1000 of the LIDAR system 230.

Nevertheless, it is also contemplated that the normal direction 285 may be determined by the electronic device 210 in the system of coordinates 1000 in accordance with known techniques in the art.

Determination the Axis of Symmetry of the Vehicle

Figure 5:
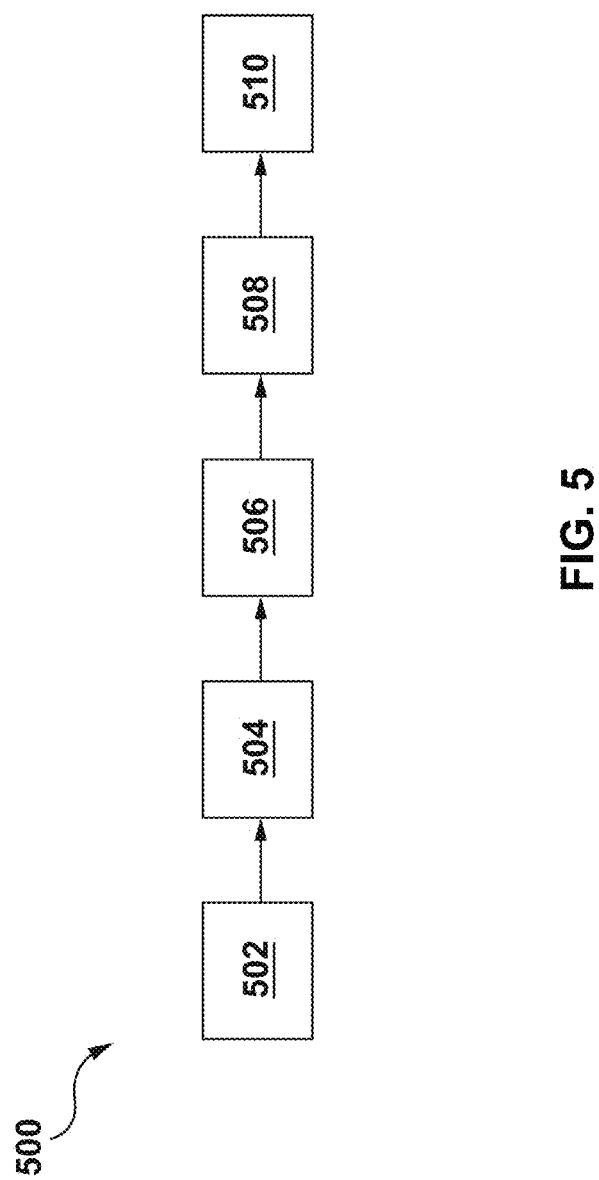
FIG. 5 depicts a schematic illustration of a plurality of computer-implemented operations that an electronic device of the networked computing environment of FIG. 2 is configured to execute for determining an axis of symmetry of the vehicle of the networked computing environment of FIG. 2 in at least some embodiments of the present technology.

With reference to FIG. 5, there is depicted a plurality of computer-implemented operations 500 that the electronic device 210 may be configured to execute for determining the axis of symmetry 800 of the vehicle 220. The plurality of computer-implemented operations 500 comprises: (i) a filtering operation 502, (ii) a mirroring operation 504, (iii) a projection operation 506, (iv) a Symmetrically-Opposing-Detected-Data-Point-Identification (SODDPI) operation 508 and (v) an axis identification operation 510. The plurality of computer-implemented operations 500 will now be discussed in turn.

As mentioned above, the LIDAR system 230 is configured to generate the plurality of detected data points 420 that together represent a multidimensional map of objects in the surroundings of the LIDAR system 230 (including the outer surface of the vehicle 220, the ground surface 280, and other potential objects). The electronic device 210 may be configured to acquire data indicative of the plurality of detected data points 420 from the LIDAR system 230.

In some embodiments, the electronic device 210 may be configured to perform the filtering operation 502 on the plurality of detected data points 420. Broadly speaking, performing the filtering operation 502 may allow the electronic device 210 to determine a subset of detected data points 600, depicted in FIG. 6, from the plurality of detected data points 420 provided by the LIDAR system 230 and which represents the outer surface of the vehicle 220.

Figure 6:
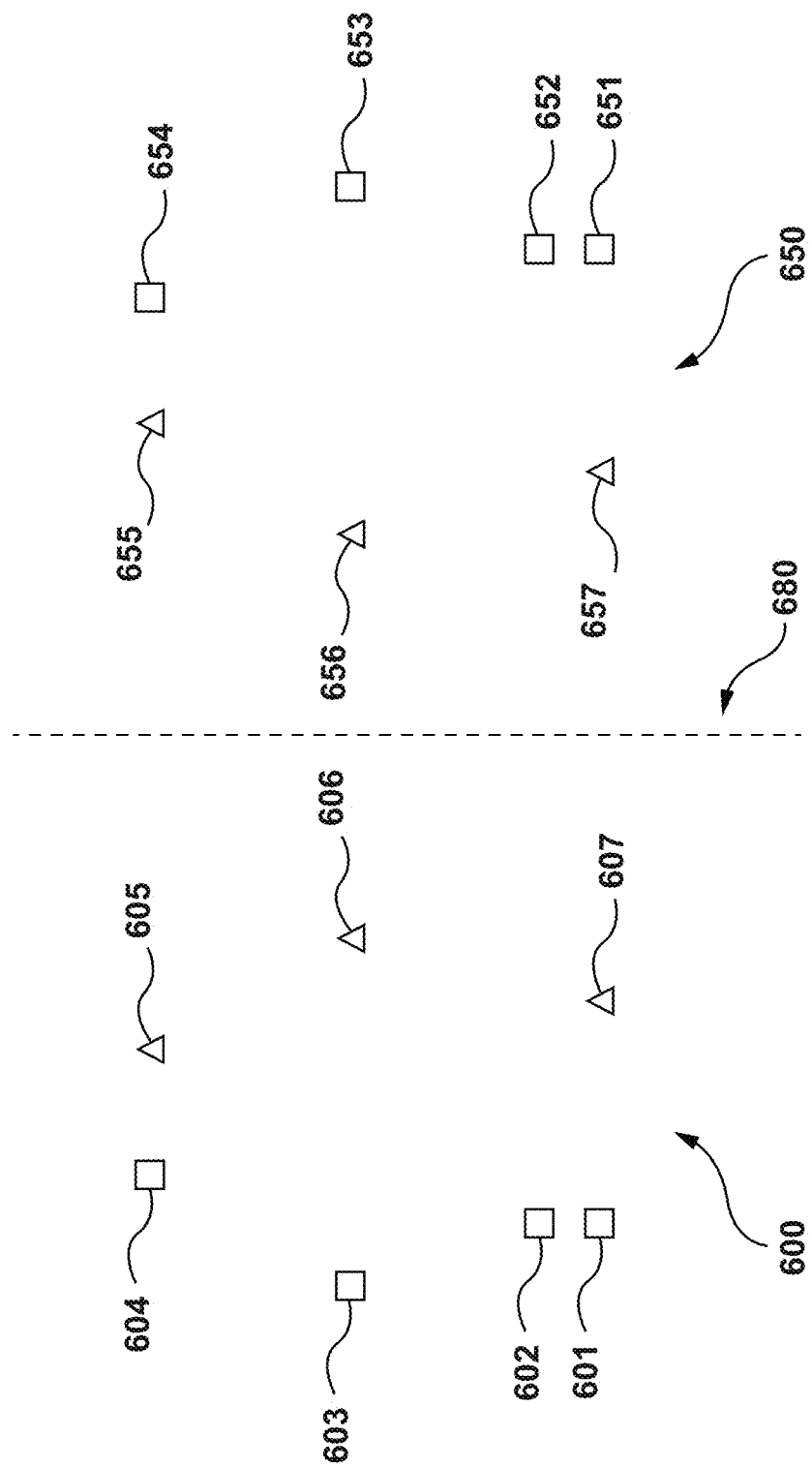
FIG. 6 depicts a subset of detected data points provided by the LIDAR system of the networked computing environment of FIG. 2 representing an outer surface of the vehicle of the networked computing environment of FIG. 2, and a subset of mirror-image data points generated by the electronic device of the networked computing environment of FIG. 2 representing a mirror-image of the outer surface of the vehicle of the networked computing environment of FIG. 2 in a non-limiting embodiment of the present technology.

It should be noted that, for the sake of simplicity, (i) a total number of detected data points in the subset of detected data points 600 that represent the outer surface of the vehicle 220 (as illustrated in FIG. 6) is reduced in comparison to (ii) a total number of detected data points in the plurality of detected data points 420 that represent the outer surface of the vehicle 220 (as illustrated in FIG. 4).

In some cases, the filtering operation 502 may be implemented in accordance with known techniques. However, in at least some embodiments, the electronic device 210 may be configured to perform the filtering operation 502 by applying an approximation rule onto the given plurality of detected data points of the LIDAR system 230. For example, the approximation rule may comprise an indication of a threshold distance deemed to include the subset of detected data points 600 (e.g., a threshold distance deemed to include the outer surface of the vehicle 220). Hence, detected data points from the plurality of detected data points 420 of the LIDAR system 230 being within the threshold distance from the LIDAR system 230 may be identified by the electronic device 210 as being part of the subset of detected data points 600.

Irrespective of how the filtering operation 502 is implemented, it should be noted that the purpose of the filter operation 502 is to identify which detected data points from the surroundings of the LIDAR system 230 correspond to the outer surface of the vehicle 220.

In other embodiments however, the filtering operation 502 may be performed simultaneously to when the electronic device 210 is configured to filter out detected data points that do not correspond to the ground surface 280 and/or determine which detected data points from the plurality of detected data points 420 correspond to the ground surface 280. In other words, the electronic device 210 may be configured to determine simultaneously from the plurality of detected data points 420 (i) which detected data points correspond to the ground surface 280 and (ii) which detected data points are to be included in the subset of detected data points representing the outer surface of the vehicle 220.

It is also contemplated that, in at least some embodiments, the filtering operation 502 may be optional and, therefore, omitted from the plurality of computer-implemented operations 500 that the electronic device 210 performs for determining the axis of symmetry 800 of the vehicle 220.

Overall, it should be noted that the manner in which the electronic device 210 selects/determines the subset of detected data points 600 representing the outer surface of the vehicle 220 from the plurality of detected data points 420 is not particularly limiting.

In some embodiments of the present technology, the electronic device 210 may also be configured to provide an indication to increase the outer surface of the vehicle 220. In one non-limiting example, the electronic device 210 may be configured to provide such indication to the human operator during extrinsic calibration of the LIDAR system 230. It is contemplated that the electronic device 210 may be configured to provide such indication for a variety of reasons such as, for example, in response to the electronic device 210 determining that the subset of detected data points 600 does not include a minimum threshold number of data points.

Such indication to increase the outer surface of the vehicle 220 may be provided in different forms by the electronic device 210. In one embodiment, providing the indication to increase the outer surface of the vehicle 220 may comprise the electronic device 210 being configured to provide an indication to fully open opposite doors of the vehicle 220. In another embodiment, providing the indication to increase the outer surface of the vehicle 220 may comprise the electronic device 210 being configured to provide an indication to fully open a trunk of the vehicle 220.

Returning to FIG. 5, as mentioned above, the electronic device 210 is also configured to perform the mirroring operation 504. Broadly speaking, the electronic device 210 may be configured to perform the mirroring operation 504 for generating a subset of mirror-image data points 650 based on the subset of detected data points 600 (see FIG. 6). It should be noted that the electronic device 210 employing the mirroring operation 504 may generate the subset of mirror-image data points 650 such that the subset of mirror-image data points 650 represents a mirror-image of the outer surface of the vehicle 220.

It is contemplated that by performing the mirroring operation 504, the electronic device 210 may be configured to generate the subset of mirror-image data points 650 in a same multidimensional space as the subset of detected data points 600. In other words, once the mirroring operation 504 is performed by the electronic device 210, the electronic device 210 may have access to both (i) the subset of detected data points 600 representing the outer surface of the vehicle 220 and (ii) the subset of mirror-image data points 650 representing a mirror-image of the outer surface of the vehicle 220, in the same multidimensional space.

To better illustrate this, in FIG. 6, there is depicted a virtual mirroring axis 680 that the electronic device 210 may employ in order to generate the subset of mirror-image data points 650 based on the subset of detected data points 600 during the mirroring operation 504. How the electronic device 210 determines the virtual mirroring axis 680 is not limiting. It should also be noted that the virtual mirroring axis 680 is depicted for illustration purposes only and, as such, it is contemplated that the electronic device 210 is not necessarily configured to render a visual representation of the virtual mirroring axis 680.

As it can be seen, the subset of detected data points 600 includes detected data points 601, 602, 603, 604, 606, and 607. The electronic device 210 may be configured to employ the virtual mirroring axis 680 for generating the subset of mirror-image data points 650 such that:

- a mirror-image data point 657 from the subset of mirror-image data points 650 is generated based on the detected data points 607;
- a mirror-image data point 656 from the subset of mirror-image data points 650 is generated based on the detected data points 606;
- a mirror-image data point 655 from the subset of mirror-image data points 650 is generated based on the detected data points 605;
- a mirror-image data point 654 from the subset of mirror-image data points 650 is generated based on the detected data points 604;
- a mirror-image data point 653 from the subset of mirror-image data points 650 is generated based on the detected data points 603;
- a mirror-image data point 652 from the subset of mirror-image data points 650 is generated based on the detected data points 602; and
- a mirror-image data point 651 from the subset of mirror-image data points 650 is generated based on the detected data points 601.

Once the subset of mirror-image data points 650 is generated by the electronic device 210, the electronic device 210 is also configured to perform the projection operation 506 (see FIG. 5). Broadly speaking, the electronic device 210 may be configured to perform the projection operation 506 on the subset of mirror-image data points 650 so that the subset of mirror-image data points 650, in a sense, "overlaps" the subset of detected data points 600. In other words, the electronic device 210 may be configured to perform the projection operation 506 for defining given pairs of overlapping data points between (i) the subset of detected data points 600 and (ii) the subset of mirror-image data points 650, when the subset of mirror-image data points 650 overlaps the subset of detected data points 600.

It is contemplated that during the projection operation 506, the electronic device 210 may be configured to iteratively minimize the distance between the subset of detected data points 600 and the subset of mirror-image data points 650 (for example, the distance between the subsets 600 and 650 as a whole) until the subset of mirror-image data points 650 overlaps the subset of detected data points 600. For example, in some embodiments, as part of the projection operation 506, the electronic device 210 may be configured to apply an Iterative Closest Point (ICP) algorithm for the iterative minimization of the distance between the subset of detected data points 600 and the subset of mirror-image data points 650.

In some embodiments of the present technology, it is contemplated that iteratively minimizing the distance between the subset of detected data points 600 and the subset of mirror-image data points 650 may comprise the electronic device 210 being configured to define a transformation rule between the subset of detected data points 600 and the subset of mirror-image data points 650 so as to overlap a given mirror-image data point from the subset of mirror-image data points 650 with a given detected data point from the subset of detected data points 600.

Figure 7:
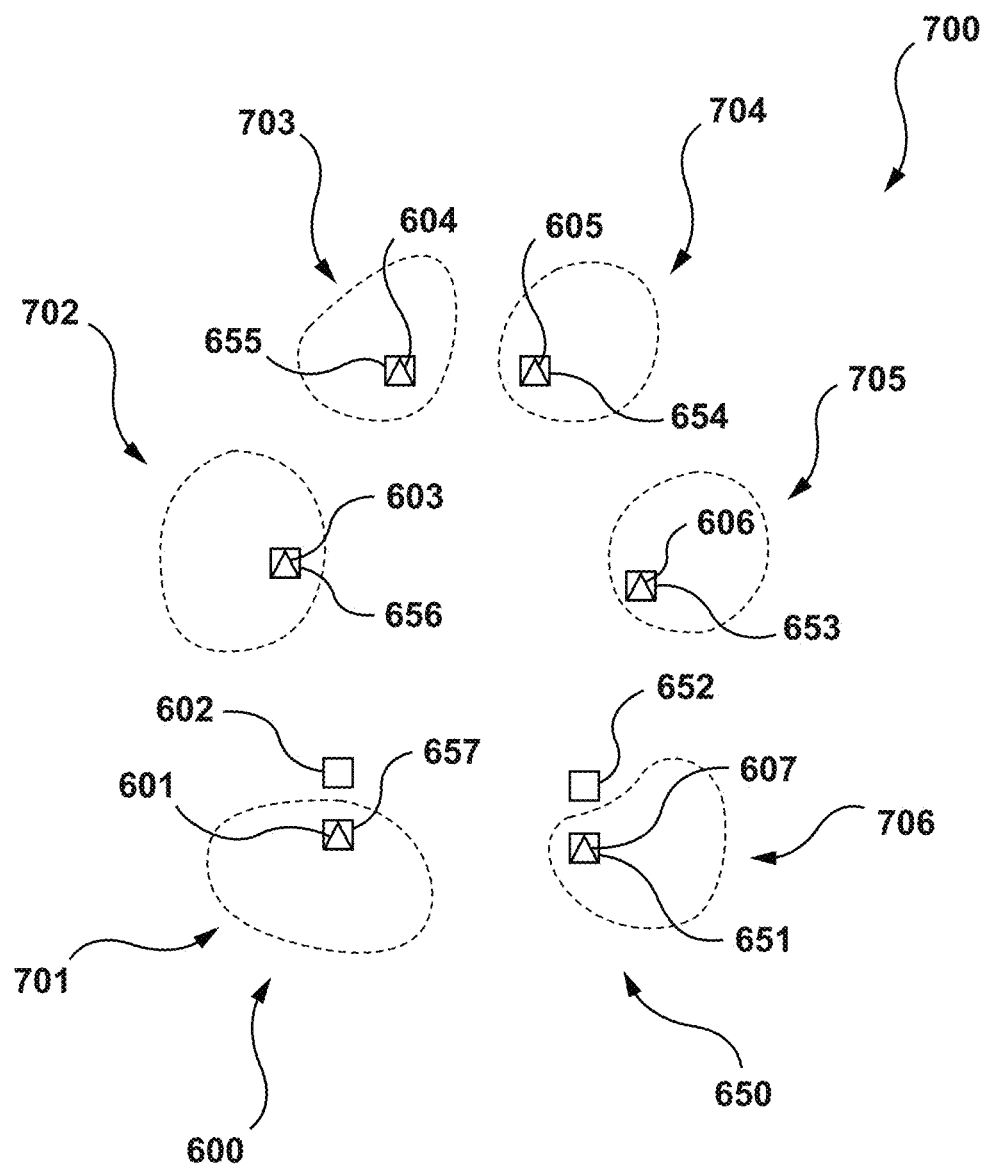
FIG. 7 depicts a plurality of overlapping data points defined by the electronic device of the networked computing environment of FIG. 2 as result of a projection operation of FIG. 5 in a non-limiting embodiment of the present technology.

To better illustrate this, with reference to FIG. 7, there is depicted an output 700 of the projection operation 506. It should be noted that the output 700 is depicted in FIG. 7 for illustration purposes only, and that the electronic device 210 is not necessarily configured to render such a visual representation of the output 700.

As it can be seen from the output 700, the subset of the mirror-image data points 650 overlaps the subset of detected data points 600. When the subset of the mirror-image data points 650 overlaps the subset of detected data points 600, the electronic device 210 thereby defines given pairs of overlapping data points between (i) the subset of detected data points 600 and (ii) the subset of mirror-image data points 650, such as:

- a first pair of overlapping data points 701 including (i) the detected data point 601 and (ii) the mirror-image data point 657;
- a second pair of overlapping data points 702 including (i) the detected data point 603 and (ii) the mirror-image data point 656;
- a third pair of overlapping data points 703 including (i) the detected data point 604 and (ii) the mirror-image data point 655;
- a fourth pair of overlapping data points 704 including (i) the detected data point 605 and (ii) the mirror-image data point 654;
- a fifth pair of overlapping data points 705 including (i) the detected data point 606 and (ii) the mirror-image data point 653; and
- a sixth pair of overlapping data points 706 including (i) the detected data point 607 and (ii) the mirror-image data point 651.

As mentioned above, this output 700 may be generated by the electronic device 210 iteratively minimizing the distance between the subset of detected data points 600 and the subset of mirror-image data points 650 in the same multidimensional space. In other words, the electronic device 210 may be configured to perform a series of computational iterations in order to generate the output 700, where during each iteration of the series of computational iterations the electronic device 210 is tasked with minimizing the distance between the subset of detected data points 600 and the subset of mirror-image data points 650 in the same multidimensional space. Again, as mentioned above, in at least some embodiments of the present technology, generation of data indicative of the output 700 may be achieved by the electronic device 210 employing the ICP algorithm.

It should be noted that in some cases, not all detected data points from the subset of detected data points 600 will be overlapped by respective mirror-image data points from the subset of mirror-image data points 650 following the projection operation 506. For example, as illustrated in FIG. 7, the detected data point 602 from the subset of detected data points 600 is not overlapped by any mirror-image data point from the subset of mirror-image data points 650.

This also means that, in some cases, not all mirror-image data points from the subset of mirror-image data points 650 will overlap a respective detected data point from the subset of detected data points 600 following the projection operation 506. For example, as illustrated, the mirror-image data point 652 from the subset of mirror-image data points 650 is not overlapping any detected data point from the subset of detected data points 600.

Nevertheless, the electronic device 210 employing the projection operation 506 may be configured to iteratively minimize the distance between the subset of detected data points 600 and the subset of mirror-image data points 700 until a threshold number and/or a threshold proportion of detected data points from the subset of detected data points 600 is overlapped by respective mirror-image data points from the subset of mirror-image data points 700. It is contemplated that this threshold number and/or this threshold proportion of detected data points may be predetermined by a human operator in at least some embodiments of the present technology.

It should be noted that by executing the projection operation 506, as explained above, the electronic device 210 defines the pairs of overlapping data points 701, 702, 703, 704, 705 and 706. It should also be noted that data points in any given pair of overlapping data points so-defined by the electronic device 210 have a particular relationship amongst each other.

The relationship amongst data points in any given pair of overlapping data points is as follows: any given pair of overlapping data points defined by the electronic device 210 performing the projection operation 506 includes (i) a first data point from the subset of detected data points 600 and (ii) a second data point from the subset of mirror-image data points 650, and such that the second data point is a mirror-image of a third data point from the subset of detected data points 600 that is symmetrically opposite to the first data point in the subset of detected data points 600.

To better illustrate this relationship, let's take the example of the first pair of overlapping data points 701. As mentioned above, the pair of overlapping data points 701 includes (i) a first data point being the detected data point 601 from the subset of detected data points 600 and (ii) a second data point being the mirror-image data point 657 from the subset of mirror-image data points 650. Recalling that the mirror-image data point 657 is generated as a mirror-image of the detected data point 607 (i.e., the third data point associated with the first pair of overlapping data points 701), and since the mirror-image data point 657 overlaps the detected data point 601, the detected data point 607 (i.e., the third data point) must be a symmetrically opposite detected data point to the detected data point 601 in the subset of detected data points 600.

Put another way, the relationship amongst data points in a given pair of overlapping data points can also be explained as follows: if the detected data point 607 (i.e., the third data point) is not symmetrically opposite to the detected data point 601 in the subset of detected data points 600, by generating the mirror-image data point 657 (i.e., the second data point in the first pair of overlapping data points 701) via the mirroring operation 504 and then projecting the mirror-image data point 657 via the projection operation 506, the mirror-image data 657 would not overlapped the detected data point 601 (i.e., the first data point in the first pair of overlapping data points 701).

Therefore, it can be said that, if a given pair of overlapping data points is defined via the electronic device 210 executing the projection operation 506, then the detected data point (i.e., the first data point) in that given pair of overlapping data points must be symmetrically opposite to an other detected data point (i.e., the third data point) in the subset of detected data points 600 and that this other detected data point is the one based on which the mirror-image data point (i.e., the second data point) in that given pair of overlapping data points has been generated.

It should be noted that this relationship amongst data points in a given pair of overlapping data points is present in each one of the pairs of overlapping data points 701, 702, 703, 704, 705, and 706 as illustrated in the non-limiting example of FIG. 7. This means that:

- since the second pair of overlapping data points 702 is defined by the projection operation 506, then the detected data point 603 (the first data point in the second pair of overlapping data points 702) is symmetrically opposite to the detected data point 606 in the subset of detected data points 600, based on which the mirror-image data point 656 (the second data point in the second pair of overlapping data points 702) has been generated;
- since the third pair of overlapping data points 703 is defined by the projection operation 506, then the detected data point 604 (the first data point in the third pair of overlapping data points 703) is symmetrically opposite to the detected data point 605 in the subset of detected data points 600, based on which the mirror-image data point 655 (the second data point in the third pair of overlapping data points 703) has been generated;
- since the fourth pair of overlapping data points 704 is defined by the projection operation 506, then the detected data point 605 (the first data point in the fourth pair of overlapping data points 704) is symmetrically opposite to the detected data point 604 in the subset of detected data points 600, based on which the mirror-image data point 654 (the second data point in the fourth pair of overlapping data points 704) has been generated;
- since the fifth pair of overlapping data points 705 is defined by the projection operation 506, then the detected data point 606 (the first data point in the fifth pair of overlapping data points 705) is symmetrically opposite to the detected data point 603 in the subset of detected data points 600, based on which the mirror-image data point 653 (the second data point in the fifth pair of overlapping data points 705) has been generated; and
- since the sixth pair of overlapping data points 706 is defined by the projection operation 506, then the detected data point 607 (the first data point in the sixth pair of overlapping data points 706) is symmetrically opposite to the detected data point 601 in the subset of detected data points 600, based on which the mirror-image data point 651 (the second data point in the pair 706) has been generated.

It is contemplated that this relationship amongst data points in the respective pairs of overlapping data points 701, 702, 703, 704, 705, and 706 may be exploited by the electronic device 210 for determining the axis of symmetry of the vehicle 220. For example, the electronic device 210 may be configured to perform the SODDPI operation 508 (see FIG. 5) during which the electronic device 210 may make use of this relationship amongst data points in the respective pairs of overlapping data points 701, 702, 703, 704, 705, and 706.

Broadly speaking, during the SODDPI operation 508, the electronic device 210 is configured to determine which detected data points in the subset of detected data points 600 are symmetrically opposite to each other in the subset of detected data points 600. As mentioned above, once the pairs of overlapping data points 701, 702, 703, 704, 705, and 706 are defined by the projection operation 506, the electronic device 210 may be configured to determine during the SODDPI operation 508 that:

- the detected data points 601 and 607 are symmetrically opposite data points in the subset of detected data points 600;
- the detected data points 603 and 606 are symmetrically opposite data points in the subset of detected data points 600; and
- the detected data points 604 and 605 are symmetrically opposite data points in the subset of detected data points 600.

By the same token, in some embodiments of the present technology, the electronic device 210 may perform the SODDPI operation 508 in order to determine which detected data points in the subset of detected data points 600 do not have symmetrically opposite detected data points in the subset of detected data points 600.

To better illustrate this, let's take the example of the detected data point 602. It should be noted that the detected data point 602 is not part of any pair of overlapping data points that have been defined as a result of the projection operation 506. In other words, the detected data point 602 is not overlapped by any mirror-image data point from the subset of mirror-image data points 650. In this case, the electronic device 210 may be configured to determine during the SODDPI operation 508 that the detected data point 602 does not have a symmetrically opposite detected data point in the subset of detected data points 600 because, otherwise, the detected data point 602 would have been overlapped by a mirror-image of this symmetrically opposite detected data point following the projection operation 506.

In summary, during the SODDPI operation 508, the electronic device 210 may be configured to determine which detected data points in the subset of detected data points have symmetrically opposite detected data points in the subset of detected data points 600 (and, optionally, which detected data points do not have symmetrically opposite detected data points).

In some embodiments of the present technology, the electronic device 210 may be configured to use this information about which detected data points have symmetrically opposite detected data points in the subset of detected data points 600 in order to perform the axis determination operation 510 for determining the axis of symmetry of the vehicle 220. How the electronic device 210 is configured to perform the axis determination procedure 510 will now be described with reference the FIG. 8.

As part of the axis determination operation 510, the electronic device 210 may be configured to select a given pair of symmetrically opposite detected data points and determine a given mid point amongst them in the multidimensional space. For example, the electronic device 210 may be configured to select the detected data points 604 and 605 (which are symmetrically opposite to each other in the subset of detected data points 600) and may be configured to determine a first mid point 802. In another example, the electronic device 210 may be configured to select the detected data points 603 and 606 (which are symmetrically opposite to each other in the subset of detected data points 600) and may be configured to determine a second mid point 804. In a further example, the electronic device 210 may be configured to select the detected data points 601 and 607 (which are symmetrically opposite to each other in the subset of detected data points 600) and may be configured to determine a third mid point 806.

Also as part of the axis determination procedure 510, the electronic device 210 may also be configured to determine a given line that passes through mid points of respective pairs of symmetrically opposite detected data points. In other words, the electronic device 210 may be configured to determine the given line through any combination of at least two of (i) the first mid point 802, (ii) the second mid points 804, and (iii) the third mid point 806. As a result, the given line may be used by the electronic device 210 as the axis of symmetry 800 of the vehicle 220.

It is contemplated that the electronic device 210 may be configured to determine at least two mid points between respective pairs of symmetrically opposite detected data points in the subset of detected data points 600 in order to determine the given line passing through these at least two mid points and use the given line as the axis of symmetry of the vehicle 220.

Calibration

As previously alluded to, the electronic device 210 may be configured to use the normal direction 285 of the ground surface 280 and the axis of symmetry 800 of the vehicle 220 for performing extrinsic calibration of the LIDAR system 230. In other words, the electronic device 210 may be configured to extrinsically calibrate detected data points of the LIDAR system 230 by using (i) the normal direction 285 in the system of coordinates 1000 of the LIDAR system 230 and (ii) the axis of symmetry 800 in the system of coordinates 1000 of the LIDAR system 230.

This extrinsic calibration, during which the electronic device 210 may be configured to determine extrinsically calibrated detected data points of the LIDAR system 230 will now be described.

With reference to FIG. 10, once the electronic device 210 has determined the normal direction 285 in the system of coordinates 1000 of LIDAR system 230, the electronic device 210 may determine the first angular offset 1050 as an angle between the normal direction 285 and the one of the axes of the system of coordinates 1000 (in the illustrated example, the "z" axis).

As mentioned above, the electronic device 210 may be configured to determine the first rotational-shift rule 1060 based on the first angular offset 1050 for, in a sense, anchoring (e.g., aligning) the one of the axes of the system of coordinates 1000 (in the illustrated example, the "z" axis) with the normal direction 285. By determining this first rotational-shift rule 1060, the electronic device 210 is configured to rotate the plurality of detected data points 420 in the direction of the first arrow 1070.

It should be noted that once the one of the axes of the system of coordinates 1000 is aligned with the normal direction, the electronic device 210 may be configured to (i) determine the axis of symmetry 800 of the vehicle 220 and (ii) anchor (e.g., align) the other one of the axes of the system of coordinates 1000 (in the illustrated example, the "x" axis) therewith.

Once the electronic device 210 has determined the axis of symmetry 800 of the vehicle 220 in the system of coordinates 1000 of LIDAR system 230, as described above, the electronic device 210 may determine the second angular offset 1080 as an angle between the axis of symmetry 800 and the other one of the axes of the system of coordinates 1000 (in the illustrated example, the "x" axis).

As mentioned above, the electronic device 210 may be configured to determine the second rotational-shift rule 1090 based on the second angular offset 1080 for, in a sense, anchoring (e.g., aligning) the other one of the axes of the system of coordinates 1000 (in the illustrated example, the "x" axis) with the axis of symmetry 800. By determining this second rotational-shift rule 1090, the electronic device 210 is configured to rotate the plurality of detected data points 420 in the direction of the second arrow 1100.

Overall, it can be said that the electronic device 210 may be configured to determine the first rotational-shift rule 1060 (based on the first angular offset 1050) and the second rotational-shift rule 1090 (based on the second angular offset 1050) for anchoring the one and the one other of the axes of the system of coordinates to the normal direction 285 and to the axis of symmetry 800, respectively. As a result, the electronic device 210 may be configured to use the first rotational-shift rule 1060 and the second rotational-shift rule 1090 for rotating the plurality of detected data points 420, thereby determining an extrinsically calibrated plurality of detected data points of the LIDAR system 230.

Computer-Implemented Methods

In some embodiments, the electronic device 210 may be configured to execute a computer-implemented method 900 for calibrating the LIDAR system 230. It should be noted that in some embodiments of the present technology, the electronic device 210 may be configured to execute another computer-implemented method for determining the axis of symmetry 800 of the vehicle 220, without departing from the scope of the present technology. It should be noted that the another computer-implemented method for determining the axis of symmetry 800 of the vehicle 220 may comprise at least some steps of the computer-implemented method 900, which will now be discussed in turn.

STEP 902: Acquiring a Subset of Detected Data Points

The method 900 begins at step 902 with the electronic device 210 being configured to acquire the subset of detected data points 600 depicted in FIG. 6.

In some embodiments, prior to the step 902, the electronic device 210 may be configured to acquire the plurality of detected data points 420 (see FIG. 4) from the LIDAR system 230.

In other embodiments, the electronic device 210 may be configured to filter the plurality of detected data points 420 for determining the subset of detected data points 600. In some cases, the electronic device 210 may perform such filtering by applying the approximation rule, as mentioned above, onto the plurality of detected data points 420 of the LIDAR system 230. For example, the approximation rule may include the indication of the threshold distance deemed to include the subset of detected data points.

In other embodiments, prior to the step 902, the electronic device 210 may be configured to provide an indication to increase the outer surface of the vehicle 220 by (i) providing an indication to fully open opposite doors of the vehicle 220 and/or (ii) providing an indication to fully open a trunk of the vehicle 220.

In some embodiments, the subset of detected data points 600 and/or the plurality of detected data points 420 may be acquired in the system of coordinates 1000 of the LIDAR system 230. It is contemplated that the system of coordinates 1000 of the LIDAR system may have three orthogonal axes as illustrated in FIG. 10. In some cases, however, it is contemplated that the plurality of detected data points 420 and/or the subset of detected data points 600 may be gathered and/or generated by the LIDAR system 230 in a system of spherical coordinates and, then, may be mapped to the system of coordinates 1000 of the LIDAR system 230 having three orthogonal axes, without departing from the scope of the present technology.

It yet further embodiments, the electronic device 210 may also be configured to determine the normal direction 285 of the ground surface 280 based on the plurality of detected data points 420 of the LIDAR system 230, as mentioned above. The electronic device 210 may also be configured to anchor the one of the axes of the system of coordinates 1000 (in the illustrated example of FIG. 10, the "z" axis) based on the normal direction 285 of the ground surface 280, such that the one of the axes extends in the normal direction 285.

STEP 904: Generating a Subset of Mirror-Image Data Points

The method 900 continues to step 904 with the electronic device 210 being configured to generate the subset of mirror-image data points 650 based on the subset of detected data points 600 (see FIG. 6). As mentioned above, the subset of mirror-image data points 650 represents a mirror-image of the outer surface of the vehicle 220.

It is contemplated that the subset of mirror-image data points 650 may be generated by the electronic device 210 in the system of coordinates 1000 of the LIDAR system 230. It is also contemplated that the subset of mirror-image data points 650 may be generated in a same multidimensional space as the subset of detected data points 600, such as for example, a same 3D space as the subset of detected data points 600.

STEP 906: Projecting the Subset of Mirror-Image Data Points onto the Subset of Detected Data Points The method 900 continues to step 906 with the electronic device 210 being configured to project the subset of mirror-image data points 650 onto the subset of detected data points 600 and/or vice versa.

With reference to FIG. 7, the electronic device 210 may be configured to perform the step 906 for defining pairs of overlapping data points such as:

- the first pair of overlapping data points 701 including (i) the detected data point 601 and (ii) the mirror-image data point 657;
- the second pair of overlapping data points 702 including (i) the detected data point 603 and (ii) the mirror-image data point 656;
- the third pair of overlapping data points 703 including (i) the detected data point 604 and (ii) the mirror-image data point 655;
- the fourth pair of overlapping data points 704 including (i) the detected data point 605 and (ii) the mirror-image data point 654;
- the fifth pair of overlapping data points 705 including (i) the detected data point 606 and (ii) the mirror-image data point 653; and
- the sixth pair of overlapping data points 706 including (i) the detected data point 607 and (ii) the mirror-image data point 651.

It should be noted that each given pair of overlapping data points includes (i) a first data point from the subset of detected data points 600 and (ii) a second data point from the subset of mirror-image data points 650, such that the second data point is a mirror-image of a third data point in the subset of detected data points 600 that is symmetrically opposite to the first data point.

It is contemplated that the step 906 may comprise iteratively minimizing, by the electronic device 210, the distance between the subset of mirror-image data points 650 and the subset of detected data points 600. For example, the iterative minimization may be performed by the electronic device 210 applying the ICP algorithm.

It should be noted that, in some embodiments of the present technology, the iteratively minimization of the distance by the electronic device 210 may comprise determining a transformation rule between the subset of mirror-image data points 650 and the subset of detected data points 600 so as to overlap a given mirror-image data point with a given detected data point, and where the given mirror-image data point has been generated based on a given other detected point that is symmetrically opposite to the given detected data point.

STEP 908: Using Detected Data Points for Determining the Axis of Symmetry of the Vehicle The method 900 continues to step 902 with the electronic device 210 being configured to use (i) at least two first data points and (ii) at least two respective third data points that are symmetrically opposite to the at least two first data points for determining the axis of symmetry 800 of the vehicle 220 in the system of coordinates 1000 of the LIDAR system 230.

Figure 8:
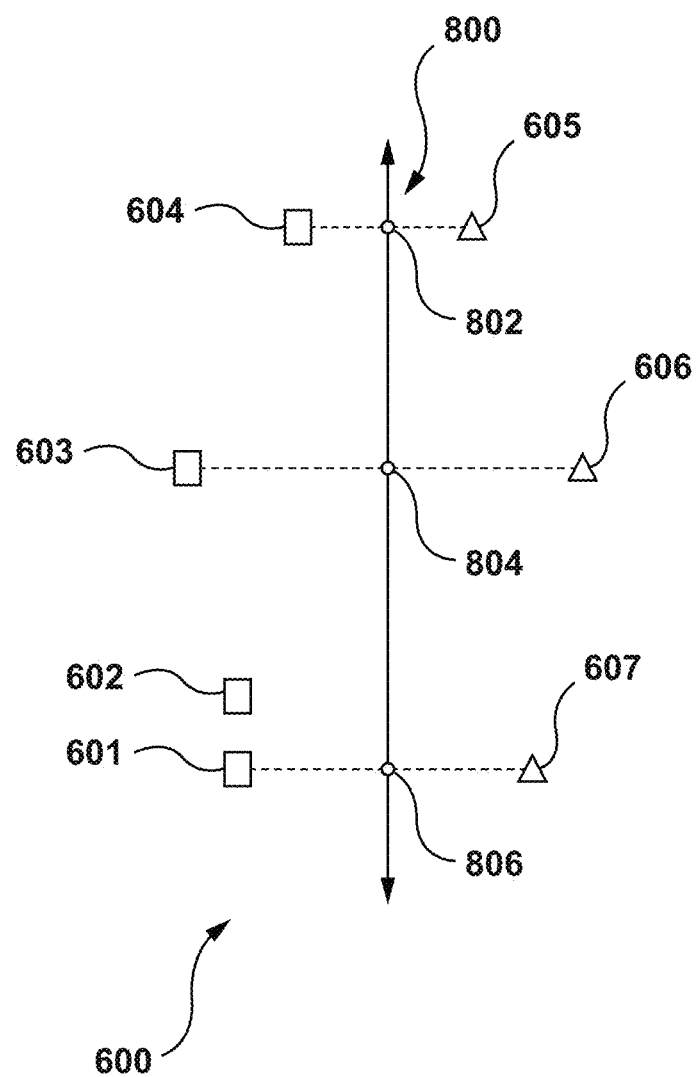
FIG. 8 depicts the axis of symmetry of vehicle of the networked computing environment of FIG. 2 as determined by the electronic device of the networked computing environment of FIG. 2 in at least some embodiments of the present technology.
Figure 9:
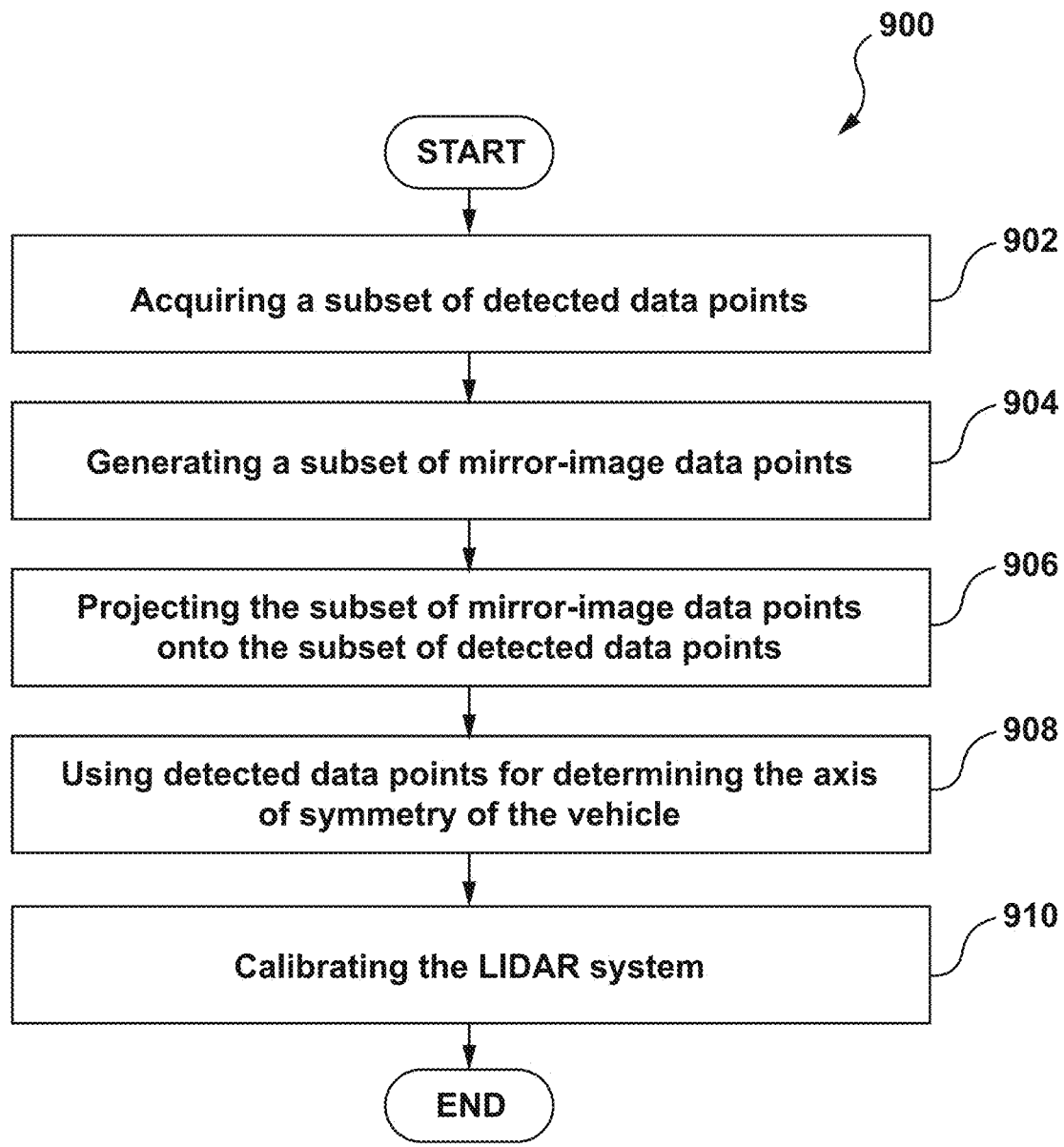
FIG. 9 depicts a flow chart of a method executable in the system of the networked computing environment of FIG. 2, in accordance with the non-limiting embodiments of the present technology.

For example, as illustrated in FIG. 8, the electronic device 210 may be configured to use at least two of the following:
- (i) the detected data points 604 (a given first data point) and the detected data point 605 (a respective third data point);
- (ii) the detected data points 603 (a given first data point) and the detected data point 606 (a respective third data point); and
- (iii) the detected data points 601 (a given first data point) and the detected data point 607 (a respective third data point).

It should be noted that, as explained above:
the detected data points 601 and 607 are symmetrically opposite data points in the subset of detected data points 600;
the detected data points 603 and 606 are symmetrically opposite data points in the subset of detected data points 600; and
the detected data points 604 and 605 are symmetrically opposite data points in the subset of detected data points 600.

It should be noted that in at least some embodiments of the present technology, the using (i) the at least two first data points and (ii) the at least two respective third data points that are symmetrically opposite to the at least two first data points for determining the axis of symmetry 800 of the vehicle 220 may comprise selecting the (i) the at least two first data points and (ii) the at least two respective third data points that are symmetrically opposite to the at least two first data points. Then, for each pair of the (i) at least two first data points and (ii) at least two respective third data points, the electronic device 210 may be configured to determine a respective midpoint.

For example, the electronic device 210 may be configured to select the detected data points 604 and 605 (which are symmetrically opposite to each other in the subset of detected data points 600) and may be configured to determine the first mid point 802. In another example, the electronic device 210 may be configured to select the detected data points 603 and 606 (which are symmetrically opposite to each other in the subset of detected data points 600) and may be configured to determine the second mid point 804. In a further example, the electronic device 210 may be configured to select the detected data points 601 and 607 (which are symmetrically opposite to each other in the subset of detected data points 600) and may be configured to determine the third mid point 806.

In some embodiments, the electronic device 210 may also be configured to determine a given line that passes through mid points of respective pairs of symmetrically opposite detected data points. In other words, the electronic device 210 may be configured to determine the given line through any combination of at least two of (i) the first mid point 802, (ii) the second mid points 804, and (iii) the third mid point 806. As a result, the given line may be used by the electronic device 210 as the axis of symmetry 800 of the vehicle 220.

It is contemplated that the electronic device 210 may be configured to determine at least two mid points between respective pairs of symmetrically opposite detected data points in the subset of detected data points 600 in order to determine the given line passing through these at least two mid points and use the given line as the axis of symmetry of the vehicle 220.

STEP 910: Calibrating the LIDAR System

The method 900 continues to step 910 with the electronic device 210 being configured to the LIDAR system 230 using a given angular offset between the axis of symmetry 800 of the vehicle 220 and the other one of the axes of the system of coordinates 1000 of the LIDAR system 230.

With reference to FIG. 10, the method 900 may comprise the electronic device 210 configured to determine the second angular offset 1080 between the axis of symmetry 800 of the vehicle 220 (e.g., a given SDV) and the one of the axes of the system of coordinates 1000 of the LIDAR system 230 (in the illustrated example, the "x" axis).

In some embodiment, the electronic device 210 may be configured to determine a rotational-shift rule 1090 based on the second angular offset 1080 for rotating in-use detected data points of the LIDAR system 230 (for example, the plurality of detected data points 420). As such, the electronic device 210 is thereby configured to determine extrinsically calibrated in-use detected data points of the LIDAR system 230.

It is further contemplated that the method 900 further be iteratively repeated by the electronic device 210 during operation of the vehicle 220. As such, the electronic device 210 may be further configured to iteratively perform extrinsic calibration of the LIDAR system 230 during operation of the vehicle 220.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of calibrating a Light Detection and Ranging (LIDAR) system, the LIDAR system having a system of coordinates, the system of coordinates having axes, one of the axes extending along a normal direction of a ground surface, the LIDAR system mountable on a self-driving vehicle (SDV), the SDV located on the ground surface, the method executable by an electronic device associated with the SDV, the method comprising:
acquiring, by the electronic device, from the LIDAR system a subset of detected data points in the system of coordinates of the LIDAR system and representing an outer surface of the SDV,
the subset of detected data points being a subset of a plurality of detected data points of the LIDAR system;
generating, by the electronic device, a subset of mirror-image data points based on the subset of detected data points,
the subset of mirror-image data points representing a mirror-image of the outer surface of the SDV;
projecting, by the electronic device, the subset of mirror-image data points onto the subset of detected data points so as to define pairs of overlapping data points, each given pair of overlapping data points including:
(i) a first data point from the subset of detected data points and (ii) a second data point from the subset of mirror-image data points,
such that the second data point is a mirror-image of a third data point in the subset of detected data points that is symmetrically opposite to the first data point;
using, by the electronic device, (i) at least two first data points and (ii) at least two respective third data points that are symmetrically opposite to the at least two first data points for determining the axis of symmetry of the SDV in the system of coordinates of the LIDAR system; and
calibrating, by the electronic device, the LIDAR system using an angular offset between the axis of symmetry of the SDV and an other one of the axes of the system of coordinates of the LIDAR system.

2. The method of claim 1, wherein the method further comprises, prior to the acquiring the subset of detected data points:
acquiring the plurality of detected data points from the LIDAR system.

3. The method of claim 2, wherein the method further comprises:
filtering, by the electronic device, the plurality of detected data points for determining the subset of detected data points.

4. The method of claim 3, wherein the filtering the plurality of detected data points comprises:
applying, by the electronic device, an approximation rule onto the plurality of detected data points detected by the LIDAR system.

5. The method of claim 4, wherein the approximation rule comprises:
an indication of a threshold distance deemed to include the detected subset of data points.

6. The method of claim 1, wherein the method further comprises, prior to acquiring the plurality of detected data points:
providing, by the electronic device, an indication to increase the outer surface of the SDV.

7. The method of claim 6, wherein the providing the indication to increase the outer surface comprises:
providing, by the electronic device, an indication to fully open opposite doors of the SDV.

8. The method of claim 6, wherein the providing the indication to increase the outer surface further comprises:
providing, by the electronic device, an indication to fully open a trunk of the SDV.

9. The method of claim 1, wherein the projecting, by the electronic device, the subset of mirror-image data points onto the subset of detected data points comprises:
iteratively minimizing, by the electronic device, the distance between the subset of mirror-image data points and the subset of detected data points.

10. The method of claim 9, wherein the iteratively minimizing the distance comprises determining a transformation rule between the subset of mirror-image data points and the subset of detected data points so as to:
overlap a given mirror-image data point with a given detected data point,
the given mirror-image data point having been generated based on a given other detected point that is symmetrically opposite to the given detected data point.

11. The method of claim 10, wherein the iteratively minimizing the distance comprises:
applying, by the electronic device, an Iterative Closest Point (ICP) algorithm.

12. The method of claim 1, wherein the (i) at least two first data points and (ii) at least two respective third data points comprises, respectively, two first data points and (ii) two respective third data points.

13. The method of claim 1, wherein the (i) at least two first data points and (ii) at least two respective third data points comprises, respectively, three first data points and (ii) three respective third data points.

14. The method of claim 1, wherein the using (i) at least two first data points and (ii) at least two respective third data points that are symmetrically opposite to the at least two first data points for determining the axis of symmetry of the SDV comprises:
selecting, by the electronic device, the (i) at least two first data points and (ii) at least two respective third data points;
for each pair of the (i) at least two first data points and (ii) at least two respective third data points, determining, by the electronic device, a mid point; and
determining, by the electronic device, a line through the respective mid points as the axis of symmetry of the SDV.

15. The method of claim 1, wherein the system of coordinates of the LIDAR system has three orthogonal axes.

16. The method of claim 1, wherein the plurality of detected data points is gathered in a system of spherical coordinates and is mapped to the system of coordinates of the LIDAR system having three orthogonal axes.

17. The method of claim 1, wherein the method further comprises, prior to the calibrating:
determining, by the electronic device, the normal direction of the ground surface based on the plurality of detected data points of the LIDAR system;
anchoring, by the electronic device, the one of the axes of the system of coordinates based on the normal direction of the ground surface,
such that the one of the axes extends in the normal direction.

18. The method of claim 1, wherein the method further comprises:
determining, by the electronic device, the angular offset between the axis of symmetry of the SDV and the one of the axes of the system of coordinates of the LIDAR system.

19. The method of claim 1, wherein the method further comprises iteratively repeating the calibrating the LIDAR system during operation of the SDV.

20. A method of determining an axis of symmetry of a self-driving vehicle (SDV), the SDV being mountable with a Light Detection and Ranging (LIDAR) system, the LIDAR system having a system of coordinates, the system of coordinates having axes, the method executable by an electronic device associated with the SDV, the method comprising:
acquiring, by the electronic device, from the LIDAR system a subset of detected data points in the system of coordinates of the LIDAR system and representing an outer surface of the SDV,
the subset of detected data points being a subset of a plurality of detected data points of the LIDAR system;
generating, by the electronic device, a subset of mirror-image data points based on the subset of detected data points,
the subset of mirror-image data points representing a mirror-image of the outer surface of the SDV;
projecting, by the electronic device, the subset of mirror-image data points onto the subset of detected data points so as to define pairs of overlapping data points, each given pair of overlapping data points including:
(i) a first data point from the subset of detected data points and (ii) a second data point from the subset of mirror-image data points,
such that the second data point is a mirror-image of a third data point in the subset of detected data points that is symmetrically opposite to the first data point;
using, by the electronic device, (i) at least two first data points and (ii) at least two respective third data points that are symmetrically opposite to the at least two first data points for determining the axis of symmetry of the SDV in the system of coordinates of the LIDAR system.

21. An electronic device for calibrating a Light Detection and Ranging (LIDAR) system, the LIDAR system having a system of coordinates, the system of coordinates having axes, one of the axes extending along a normal direction of a ground surface, the LIDAR system mountable on a self-driving vehicle (SDV), the SDV located on the ground surface, the electronic device being configured to:

acquire from the LIDAR system a subset of detected data points in the system of coordinates of the LIDAR system and representing an outer surface of the SDV, the subset of detected data points being a subset of a plurality of detected data points of the LIDAR system;

generate a subset of mirror-image data points based on the subset of detected data points,
the subset of mirror-image data points representing a mirror-image of the outer surface of the SDV;

project the subset of mirror-image data points onto the subset of detected data points so as to define pairs of overlapping data points,
each given pair of overlapping data points including:
(i) a first data point from the subset of detected data points and (ii) a second data point from the subset of mirror-image data points,
such that the second data point is a mirror-image of a third data point in the subset of detected data points that is symmetrically opposite to the first data point;

use (i) at least two first data points and (ii) at least two respective third data points that are symmetrically opposite to the at least two first data points for determining the axis of symmetry of the SDV in the system of coordinates of the LIDAR system; and calibrate the LIDAR system using an angular offset between the axis of symmetry of the SDV and an other one of the axes of the system of coordinates of the LIDAR system.

* * * * *